US012771898B2

(12) United States Patent
Saha et al.

(10) Patent No.: US 12,771,898 B2
(45) Date of Patent: Oct. 20, 2026

(54) SCENE REMOVAL, CINEMATIC VIDEO EDITING, AND IMAGE GRID OPERATIONS IN VIDEO EDITING APPLICATION

(71) Applicant: Apple Inc., Cupertino, CA (US)

(72) Inventors: Rupamay Saha, Cupertino, CA (US); Shaun M Poole, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 76 days.

(21) Appl. No.: 18/314,112

(22) Filed: May 8, 2023

(65) Prior Publication Data

US 2024/0379127 A1 Nov. 14, 2024

Related U.S. Application Data

(60) Provisional application No. 63/500,897, filed on May 8, 2023.

(51) Int. Cl.

| | |
|---|---|
| ***G06T 5/73*** | (2024.01) |
| ***G06F 3/04847*** | (2022.01) |
| ***G06F 3/0488*** | (2022.01) |
| ***G06F 3/04883*** | (2022.01) |
| ***G06T 5/70*** | (2024.01) |
| ***G06T 5/92*** | (2024.01) |
| ***G06T 11/10*** | (2026.01) |
| ***G06V 10/70*** | (2022.01) |
| ***G11B 27/031*** | (2006.01) |

(Continued)

(52) U.S. Cl.
CPC ..... *H04N 21/4312* (2013.01); *G06F 3/04847* (2013.01); *G06F 3/0488* (2013.01); *G06F 3/04883* (2013.01); *G06T 5/70* (2024.01); *G06T 5/73* (2024.01); *G06T 5/92* (2024.01); *G06T 11/10* (2026.01); *G06V 10/70* (2022.01); *G11B 27/031* (2013.01); *H04N 7/0122* (2013.01); *H04N 21/47217* (2013.01); *G06T 2200/24* (2013.01); *G06T 2207/10016* (2013.01)

(58) Field of Classification Search
CPC ....... G11B 27/031; G11B 27/022; G06T 5/73; G06T 5/70; G06T 2200/24; G06T 2207/10016; G06V 20/49
USPC .......................................................... 386/282
See application file for complete search history.

(56) References Cited

U.S. PATENT DOCUMENTS

| | | | |
|---|---|---|---|
| 5,521,841 | A | 5/1996 | Arman et al. |
| 5,758,093 | A | 5/1998 | Boezeman et al. |

(Continued)

*Primary Examiner* — Thai Q Tran
*Assistant Examiner* — Nienru Yang
(74) *Attorney, Agent, or Firm* — Invoke

(57) ABSTRACT

In some implementations, a system generates a video clip in which the user can select which entity is in-focus and which other entities are out-of-focus based on a source video clip that has already been recorded. Multiple video clips may be generated based on the source video clip with different selected entities in-focus and other entities out-of-focus. In other implementations, a system overlays an image grid on frames of a video clip and analyzes the frames based on annotation criteria to determine which portions of the frames, corresponding to respective cells of the image grid, meet the annotation criteria. The system overlays an annotation on the cells of the image grid indicative of a portion of the frames meeting the annotation criteria while refraining from overlaying the annotation on any cells of the image grid indicative of a portion of the frames that do not meet the annotation criteria.

19 Claims, 16 Drawing Sheets

(51) Int. Cl.

| | |
|---|---|
| ***H04N 7/01*** | (2006.01) |
| ***H04N 21/431*** | (2011.01) |
| ***H04N 21/472*** | (2011.01) |

(56) References Cited

U.S. PATENT DOCUMENTS

| | | | |
|---|---|---|---|
| 5,760,767 | A | 6/1998 | Shore et al. |
| 5,852,435 | A | 12/1998 | Vigneaux et al. |
| 6,332,147 | B1 | 12/2001 | Moran et al. |
| 6,463,444 | B1 | 10/2002 | Jain et al. |
| RE38,401 | E | 1/2004 | Goldberg et al. |
| RE38,609 | E | 10/2004 | Chen et al. |
| 6,807,361 | B1 | 10/2004 | Girgensohn et al. |
| 7,143,362 | B2 | 11/2006 | Dieberger et al. |
| 7,149,974 | B2 | 12/2006 | Girgensohn et al. |
| 7,660,464 | B1 | 2/2010 | Peterson |
| 8,745,499 | B2 | 6/2014 | Pendergast et al. |
| 9,600,164 | B2 | 3/2017 | Matsuda et al. |
| 9,652,125 | B2 | 5/2017 | Penha et al. |
| 9,916,865 | B2 | 3/2018 | Hwang et al. |
| 10,497,162 | B2 | 12/2019 | Kunkel et al. |
| 10,937,200 | B2 | 3/2021 | Kumar et al. |
| 11,425,283 | B1 * | 8/2022 | Thurston, III ............ G06T 7/13 |
| 11,550,452 | B1 | 1/2023 | Fortunato |
| 11,669,567 | B2 | 6/2023 | Klein et al. |
| 11,743,550 | B2 | 8/2023 | Atkins et al. |
| 11,749,312 | B2 | 9/2023 | Bache et al. |
| 11,887,630 | B2 | 1/2024 | Wu et al. |
| 2003/0184598 | A1 | 10/2003 | Graham |
| 2003/0189588 | A1 | 10/2003 | Girgensohn et al. |
| 2005/0084232 | A1 | 4/2005 | Herberger et al. |
| 2006/0093309 | A1 | 5/2006 | Herberger et al. |
| 2014/0267094 | A1 | 9/2014 | Hwang et al. |
| 2015/0077338 | A1 | 3/2015 | Dai et al. |
| 2015/0234564 | A1 | 8/2015 | Snibbe et al. |
| 2016/0006979 | A1 | 1/2016 | Gilboa-Solomon et al. |
| 2016/0103830 | A1 | 4/2016 | Cheong et al. |
| 2016/0358631 | A1 | 12/2016 | Lee |
| 2017/0352379 | A1 | 12/2017 | Oh et al. |
| 2017/0364198 | A1 | 12/2017 | Yoganandan et al. |
| 2019/0114485 | A1 | 4/2019 | Chan et al. |
| 2020/0112685 | A1 * | 4/2020 | Li ........................ H04N 23/675 |
| 2020/0296317 | A1 | 9/2020 | Post et al. |
| 2021/0004131 | A1 | 1/2021 | Varshney et al. |
| 2021/0390710 | A1 * | 12/2021 | Zhang ..................... G06F 3/013 |
| 2022/0028427 | A1 | 1/2022 | Matsuda et al. |
| 2022/0327830 | A1 | 10/2022 | Chang et al. |
| 2022/0335720 | A1 | 10/2022 | Chang et al. |
| 2022/0353425 | A1 * | 11/2022 | Manzari ............... H04N 5/2226 |
| 2022/0360736 | A1 * | 11/2022 | Hu ................. H04N 21/440245 |
| 2022/0400208 | A1 * | 12/2022 | Takao .................. H04N 23/635 |
| 2023/0281904 | A1 | 9/2023 | Habib et al. |

* cited by examiner

SCENE REMOVAL, CINEMATIC VIDEO EDITING, AND IMAGE GRID OPERATIONS IN VIDEO EDITING APPLICATION

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

INCORPORATION BY REFERENCE; DISCLAIMER

The following application is hereby incorporated by reference: application No. 63/500,897 filed on May 8, 2023. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to video editing operations that may be performed in a video editing application.

BACKGROUND

Performing video editing on a tablet or slate computer, where user input is often received via a touchscreen display, can be a time consuming and error prone task, even for experienced video editors using expensive and design-built equipment. These issues are exacerbated when standard tablet computing equipment is used by novice and less-experienced users for video editing tasks.

Intuitive user interface design and touch input recognition can enable more efficient and effective video editing, particularly when such editing is being performed with user inputs received via a touchscreen display.

OVERVIEW

In some implementations, a computing device generates a video clip in which the user can select which entity is in-focus and which other entities are out-of-focus based on a source video clip that has already been recorded. Several video clips may be generated based on the source video clip, each video clip having one or more selected entities in-focus with other entities out-of-focus.

In one or more implementations, a computing device overlays an image grid on frames of a video clip and analyzes the frames based on annotation criteria to determine which portions of the frames, corresponding to respective cells of the image grid, meet the annotation criteria. Based on this determination, the computing device overlays an annotation on the cells of the image grid indicative of a portion of the frames meeting the annotation criteria while refraining from overlaying the annotation on any cells of the image grid indicative of a portion of the frames that do not meet the annotation criteria.

In some implementations, a computing device overlays an image grid on frames of a video clip and receives user input specifying a modification to a display characteristic of the frames and a selection of a set of cells of the image grid for the modification. Based on the user input, the computing device modifies a portion of the frames corresponding the selected cells without modifying any portion of the frames corresponding to cells that were not selected.

According to one or more implementations, a computing device obtains a reference frame for generating a video without a background present. The computing device obtains source frames, applies a function to the source frames and the reference frame to compute target frames, and generates the video from the target frames where no background from the source frames is present.

Particular implementations provide at least the following advantages. A computing device is able to receive user touch input to control advanced video editing functionality, including scene removal, cinematic video editing, and image grid operations in a video editing application. This allows the user to perform these video editing functions without relying on the use of mouse or keyboard input devices.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

System Architecture

Figure 1:
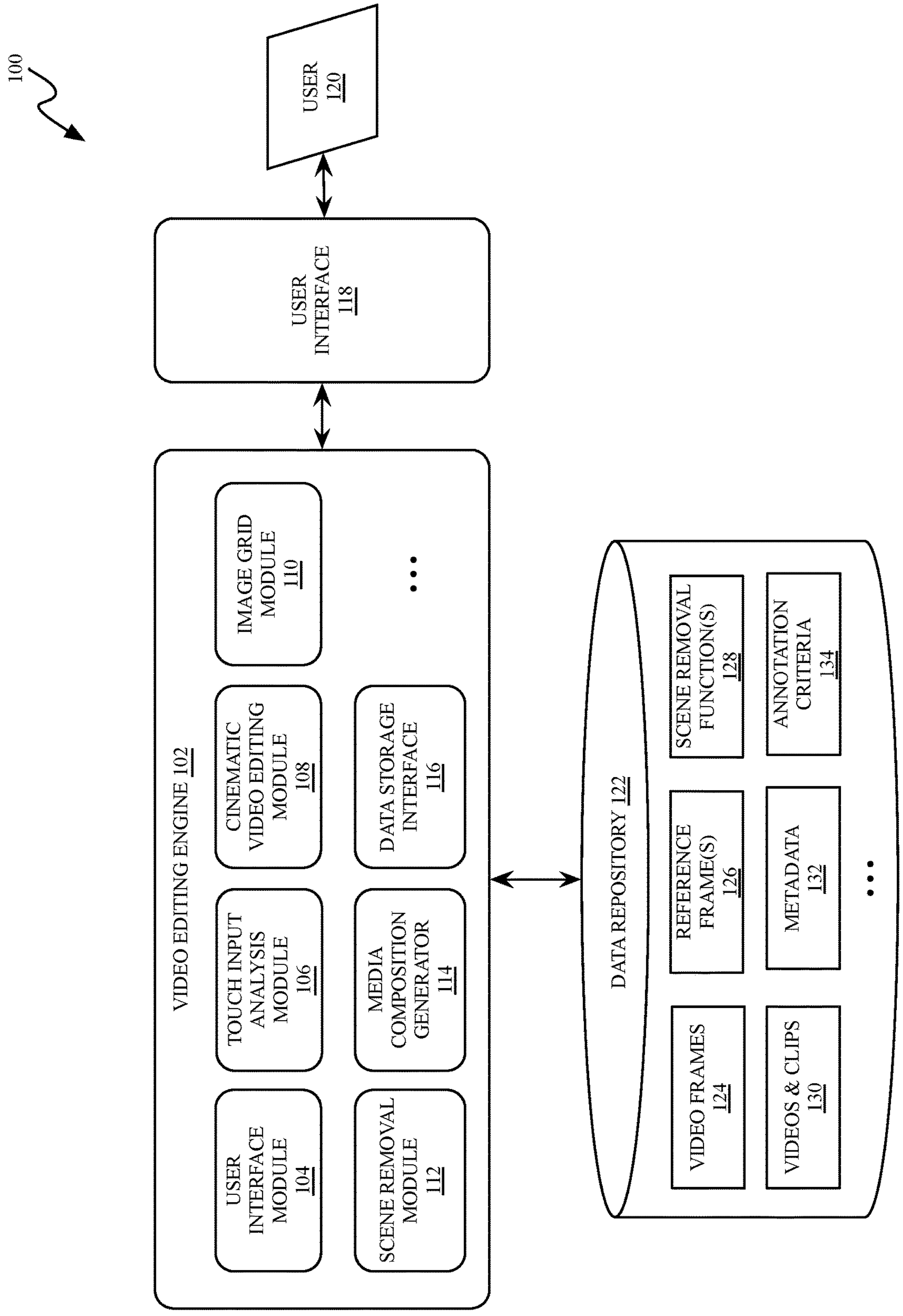
FIG. 1 is a block diagram of an example system for scene removal, cinematic video editing, and image grid operations in a video editing application.

FIG. 1 is a block diagram of an example system 100 for scene removal, cinematic video editing, and image grid operations in a video editing application based on touch input.

System 100 includes a video editing engine 102 that is electronically coupled to at least one data repository 122. Video editing engine 102 includes a set of modules and/or processes configured for performing one or more function for video editing, which are described below.

In one or more approaches, user interface module 104 of the video editing engine 102 is configured to create and/or build one or more user interfaces 118 for providing information to a user 120 and receiving user inputs. A user interface 118 may be dynamically updated based on user input received through the user interface 118 in various embodiments. Moreover, the user interface 118 may be configured to be used on a touchscreen display.

One or more user interfaces that have been generated by user interface module 104 may be stored to the data repository 122, in various approaches. The user interfaces may be generated based on user interface templates, and the user interfaces may be stored to data repository 122 with some associated identifier for quicker searching and retrieval when a specific type of user interface is requested for presentation to the user 120.

The touch input analysis module 106 of the video editing engine 102 is configured to analyze user touch inputs provided by the user 120 that are received via the active user interface 118. In a further embodiment, touch input analysis module 106 may be configured to analyze various types of touch inputs received via a touchscreen display of system 100. These touch inputs may include finger touch inputs, stylus touch inputs, and/or hover inputs where a user hovers close to the touchscreen display but does not actually contact the touchscreen display. A hover input may cause a different action to be taken versus a touch contact. Moreover, swipe inputs and multiple tap inputs may also be received via the touchscreen display and may result in different actions to be taken versus a single touch contact.

The cinematic video editing module 108 of the video editing engine 102 is configured to receive a first video clip that includes a first set of frames. In the first set of frames, a first entity is visible and in-focus while a second entity is visible and out-of-focus. Based on user input requesting that the second entity be in-focus, the cinematic video editing module 108 generates a second set of frames with the second entity being in-focus and the first entity being out-of-focus. This second set of frames is stored as a second video clip, such as to the data repository 122 as one of the videos and clips 130. These operations are described in more detail in relation to FIG. 5.

Referring again to FIG. 1, the image grid module 110 of the video editing engine 102, in one embodiment, is configured to overlay an image grid on one or more frames of a video clip. The image grid defines a set of cells. The number of cells and layout of the image grid may be selected by the user or automatically determined by the image grid module 110. The image grid module 110 also determines that a first portion of frames corresponding to a first subset of cells of the image grid meet one or more annotation criteria and that a second portion of frames corresponding to a second subset of cells of the image grid do not meet the annotation criteria. The image grid module 110, responsive to determining that the first portion of frames meet the annotation criteria, overlays an annotation on the first set of cells indicative of the first portion of frames meeting the annotation criteria. Also, responsive to determining that the second portion of frames do not meet the annotation criteria, the image grid module 110 refrains from overlaying the annotation on the second portion of frames. These operations are described in more detail in relation to FIG. 6.

In another embodiment, the image grid module 110 is configured to overlay an image grid on one or more frames of a video clip, the image grid and receive user input that includes a modification and a selection. The modification corresponds to a display characteristic of the frames, and the selection corresponds to a first subset of cells of the image grid for applying the modification. Responsive to receiving the user input, the image grid module 110 modifies a first portion of the frames corresponding to the first subset of cells without modifying a second portion of the frames corresponding to a second subset of cells that were not selected by the user input. These operations are described in more detail in relation to FIG. 7.

Referring again to FIG. 1, the scene removal module 112 of the video editing engine 102 is configured to obtain a reference frame for generating a video comprising a set of target frames. Based on a set of source frames, which may be captured by a video camera or imaging device of system 100, the scene removal module 112 applies a function to both the set of source frames and the reference frame to compute the set of target frames. The scene removal module 112 generates each target frame of the set of target frames without a background that is present in a corresponding source frame of the set of source frames. Based on these target frames, the scene removal module 112 generates the video to include the set of target frames. These operations are described in more detail in relation to FIG. 8.

Referring again to FIG. 1, the media composition generator 114 of the video editing engine 102 is configured to generate media (e.g., a media composition, video, video clip, and/or set of frames) based on available media content, video(s), video clip(s), frame(s), and/or user input. The media composition generator 114 may work in conjunction with one or more of the cinematic video editing module 108, the image grid module 110, and/or the scene removal module 112 to generate a media composition, video, video clip, and/or set of frames based on information provided to the media composition generator 114 by the various other modules of the video editing engine 102, in various approaches. Moreover, the media composition generator 114 may generate metadata associated with any of the various generated media compositions, videos, video clips, and/or set of frames.

Video editing engine 102 includes a data storage interface 116 for storing data to data repository 122 and for retrieving data from data repository 122. Data repository 122 may be used to store information and/or data for video editing engine 102 and may be any type of storage unit and/or device (e.g., a file system, database, collection of tables, or any other storage mechanism) for storing data. Further, data repository 122 may include multiple different storage units and/or devices. The multiple different storage units and/or devices may or may not be of the same type or located at the same physical site. Further, data repository 122 may be implemented or may execute on the same computing system as video editing engine 102. Alternatively or additionally, data repository 122 may be implemented or executed on a computing system separate from video editing engine 102. Data repository 122 may be communicatively coupled to any device for transmission and receipt of data via a direct connection or via a network.

Any of the cinematic video editing module 108, the image grid module 110, and/or the scene removal module 112 may analyze frames, videos, and/or video clips to determine metadata 132 associated with the frames, videos, and/or video clips. In one or more embodiments, the metadata 132 may be stored in the data repository 122 by any of the cinematic video editing module 108, the image grid module 110, and/or the scene removal module 112. Some example metadata 132 which may be associated with frames, videos, and/or video clips includes, but is not limited to, image characteristics (e.g., color levels, brightness, contrast, white balance, color saturation, sharpness, aspect ratio, subject, etc.), entities that are visible, entities that are in-focus, entities that are out-of-focus, author(s), date(s) and/or time-stamp(s), a title, a list of actor(s), a director, a producer, a format, a size, etc.

Some example annotation criteria 134 may include, but are not limited to, a target white balance, a target format, a target frame rate, a target brightness, a target color saturation, target color levels—e.g., red-blue-green settings, a target sharpness, a target contrast, etc. In addition or alternatively, annotation criteria 134 may include source information about the frames, video, or video clip, that may trigger modification and/or annotation, including but not limited to a source white balance, a source format, a source frame rate, a source brightness, a source color saturation, source color levels, a source sharpness, a source contrast, etc.

Cinematic Video Editing

Figure 2A:
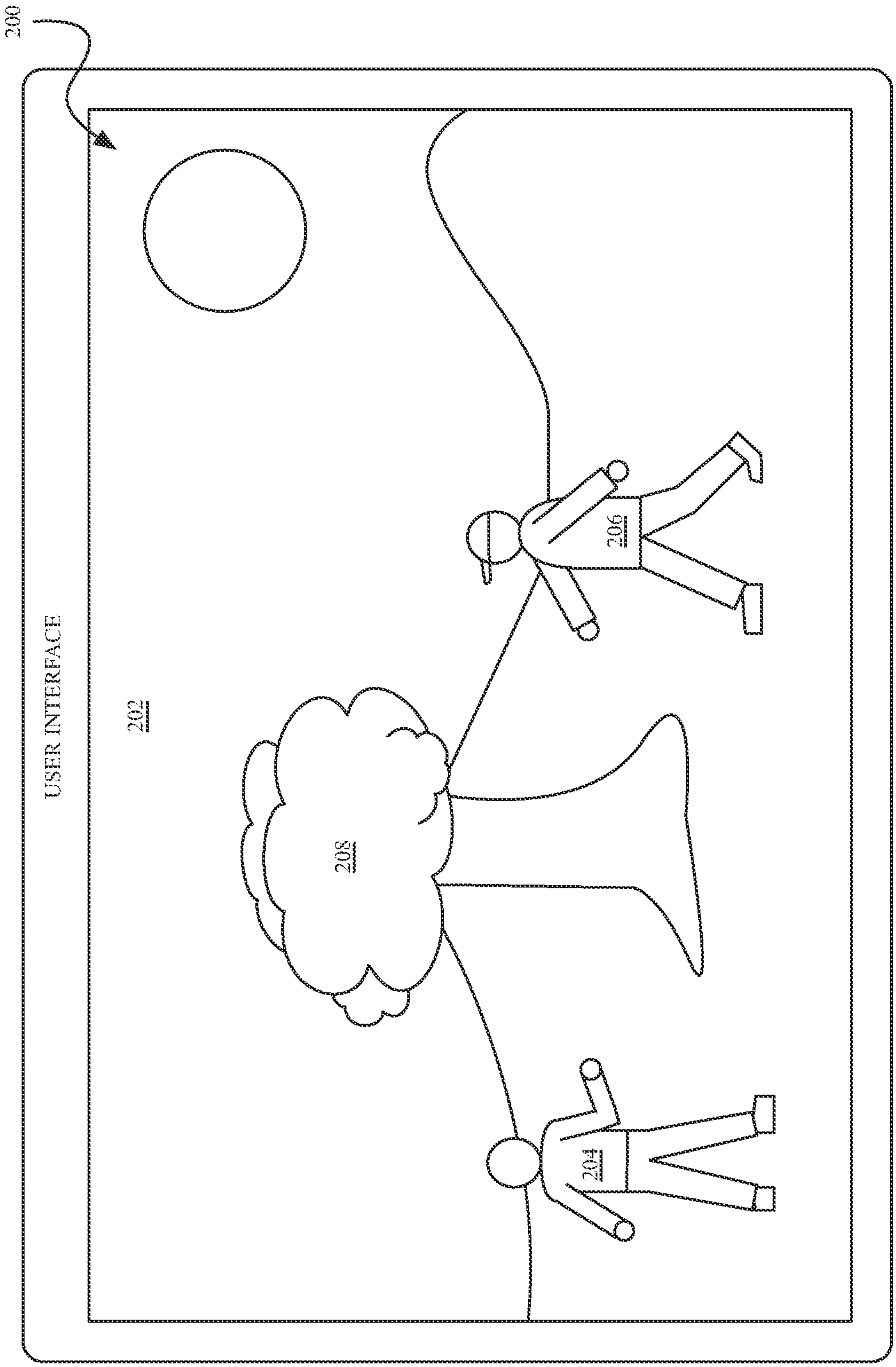
FIGS. 2A-2D illustrate a series of example video frames in a user interface configured for cinematic video editing in a video editing application.

FIGS. 2A-2D illustrate a series of example video frames in a user interface configured for cinematic video editing in a video editing application. In FIG. 2A, an example user interface is shown which may be used for cinematic video editing in a video editing application, in one embodiment. The user interface shows a video frame 200 that presents a scene having a plurality of entities. The entities include, for example, a first person 204 standing on the left side of the video frame 200, a second person 206 walking toward the first person 204, and a tree 208 positioned in front of a background 202 that includes a horizon line, sky, and sun. Cinematic video editing allows for one or more selected entities in the video frame 200 (or any other image data, such as a still image, photograph, scan, stream, etc.) to be placed in-focus, even if the selected entities were not in-focus in the originally captured frame.

Figure 2B:
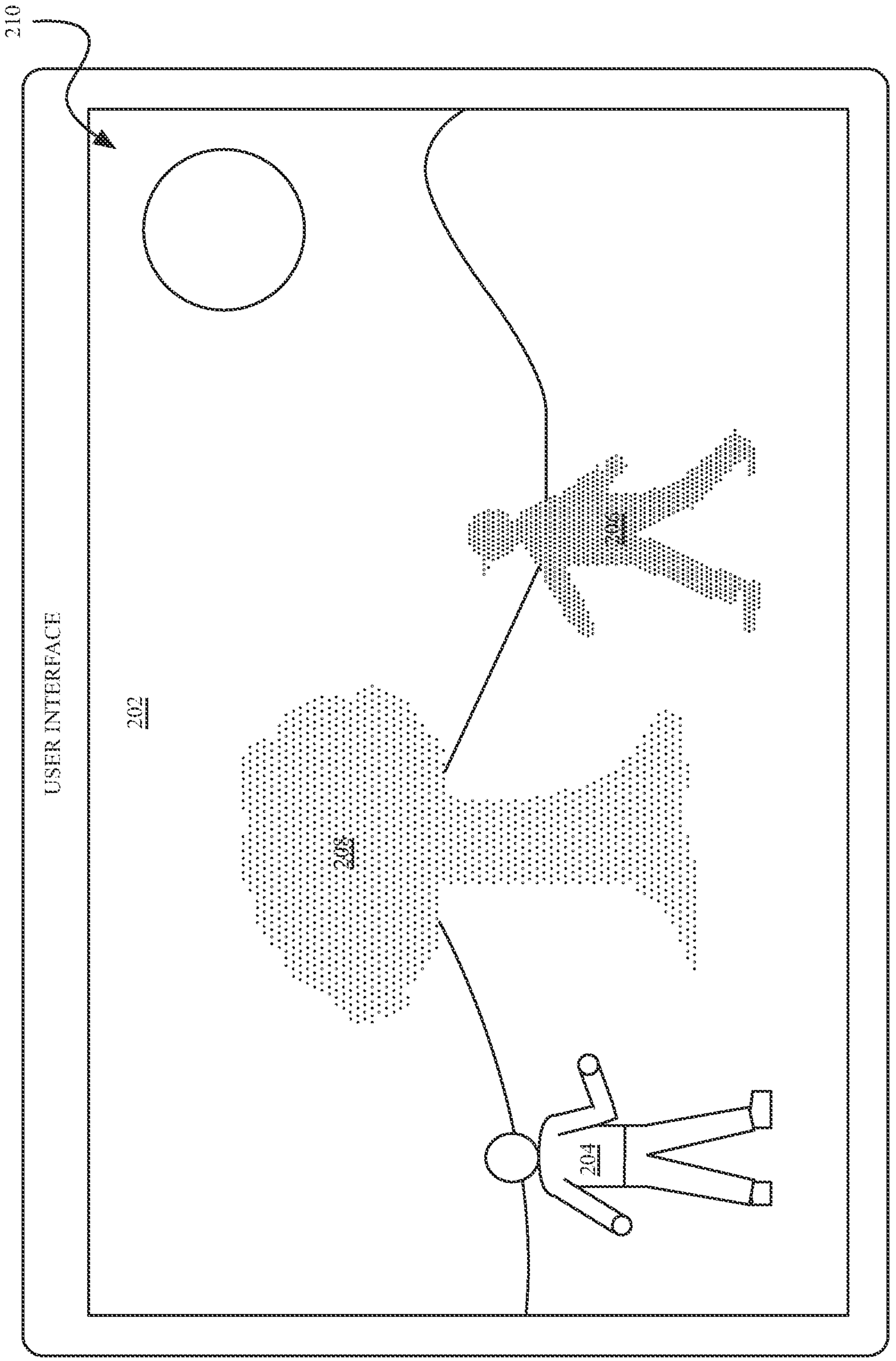

FIG. 2B shows an example video frame 210 in the user interface that presents the same scene from frame 200 after an example cinematic video edit has been performed that changes which entities appear in-focus. In video frame 210, the first person 204 has been put in-focus, while the second person 206 and the tree 208 have been put out-of-focus. The background 202 remains unchanged from video frame 200.

Figure 2C:
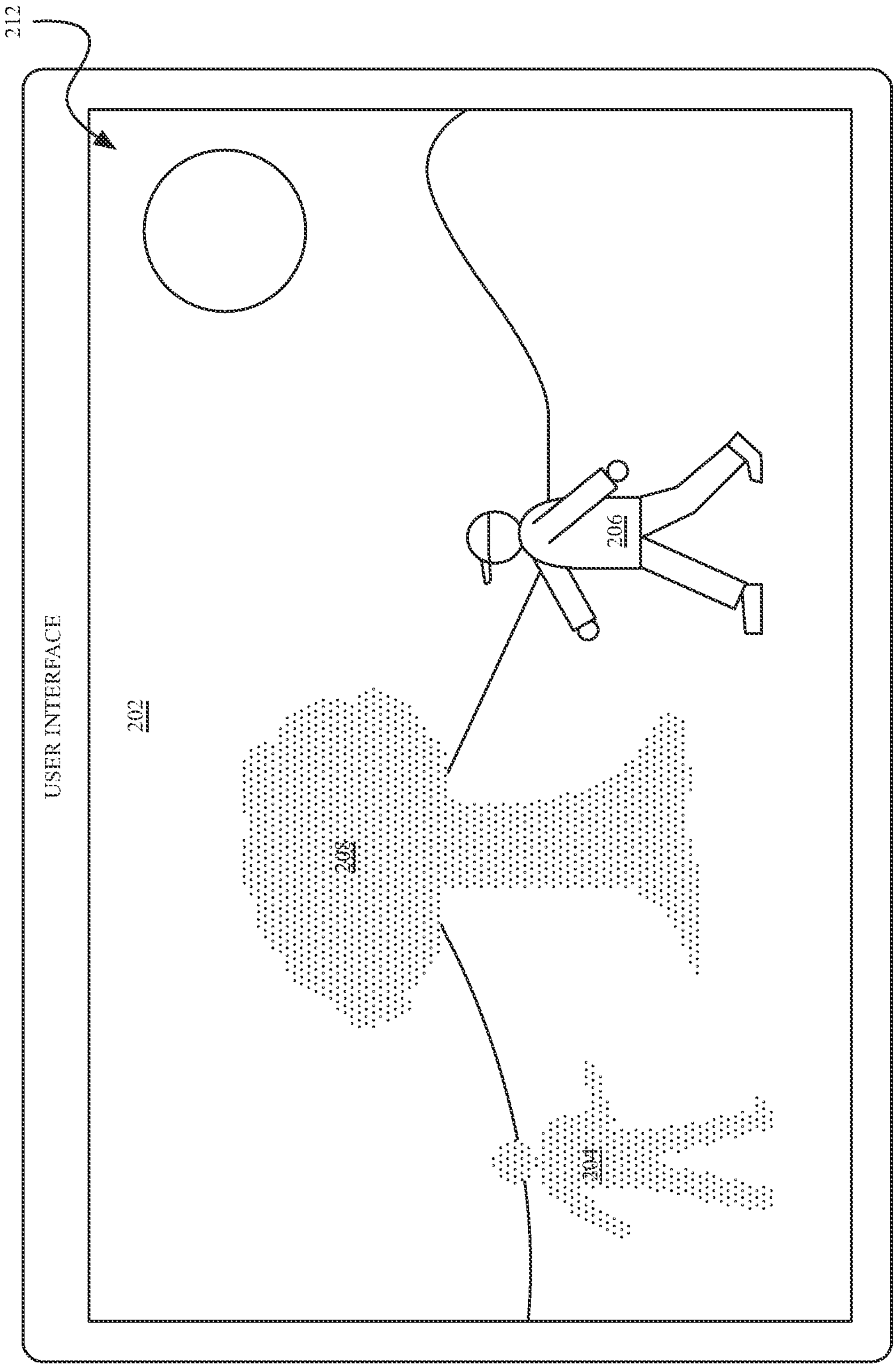

FIG. 2C shows a video frame 212 in the user interface that presents the same scene from frame 200 after an example cinematic video edit has been performed that changes which entities appear in-focus. In video frame 212, the first person 204 has been put out-of-focus, the second person 206 has been out in-focus, and the tree 208 has been put out-of-focus. The background 202 remains unchanged from video frame 200.

Figure 2D:
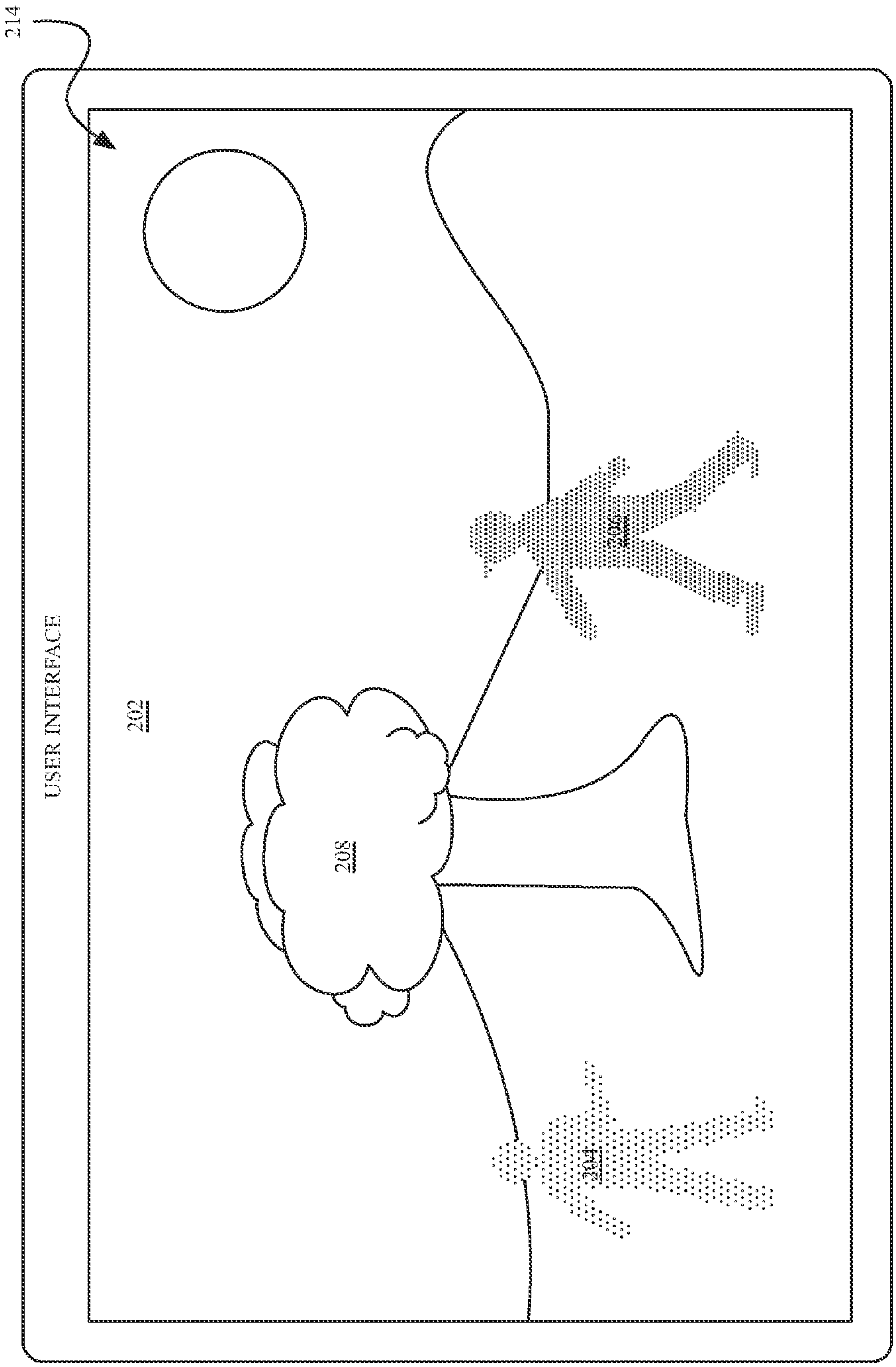

FIG. 2D shows a video frame 214 in the user interface that presents the same scene from frame 200 after an example cinematic video edit has been performed that changes which entities appear in-focus. In video frame 214, the first person 204 and the second person 206 have been put out-of-focus, and the tree 208 has been put in-focus. The background 202 remains unchanged from video frame 200.

As can be seen from these example frames, any detected entity can be put in-focus when out-of-focus in the original video frame, and any detected entity can be put out-of-focus that appeared in-focus in the original video frame. Of course, entities may also remain in an original, unchanged state of focus in any generated frames that result from cinematic video editing.

Image Grid Operations

Figure 3A:
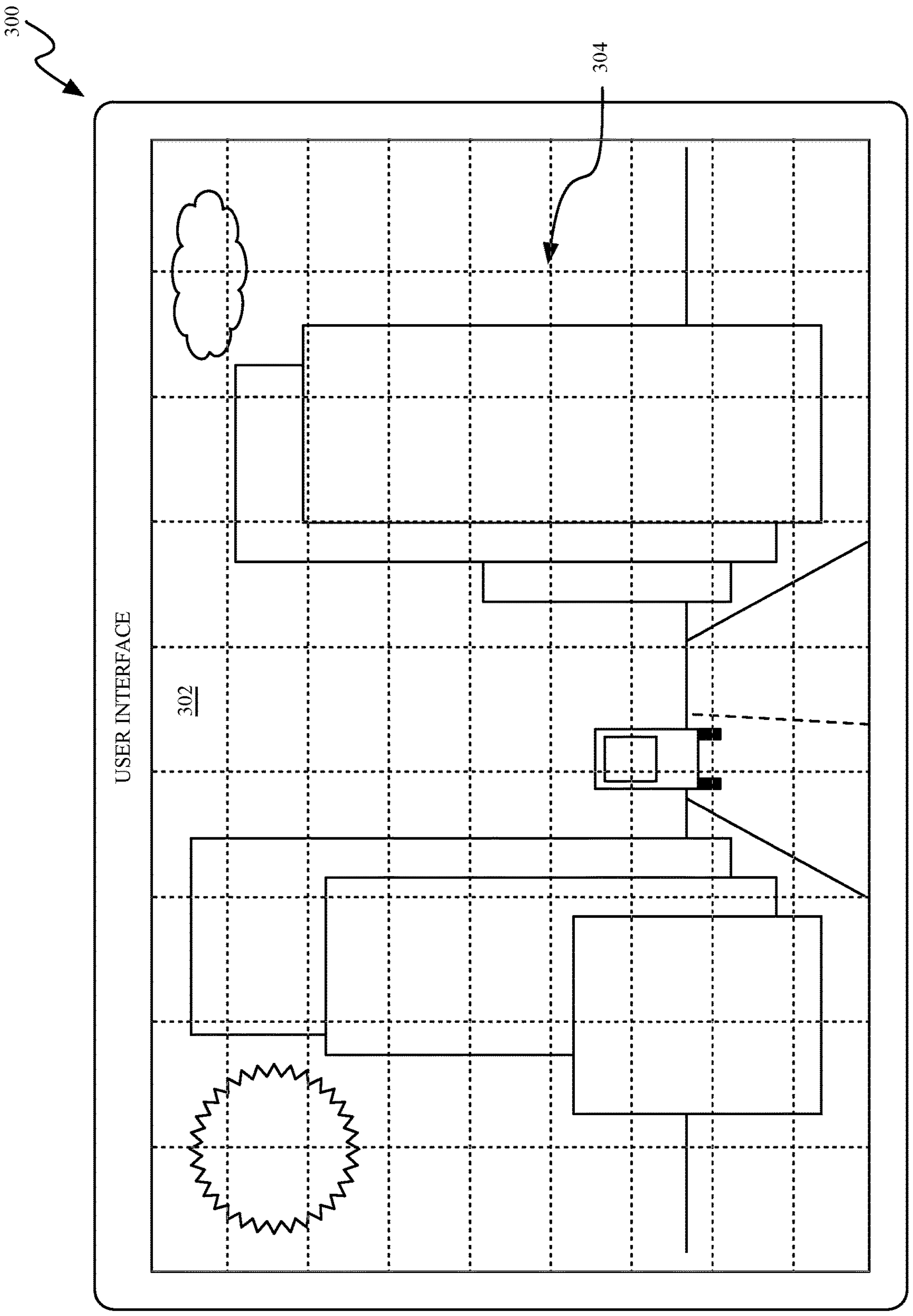
FIGS. 3A-3C illustrate a series of user interfaces showing an example video frame with image grid operations applied.
Figure 3B:
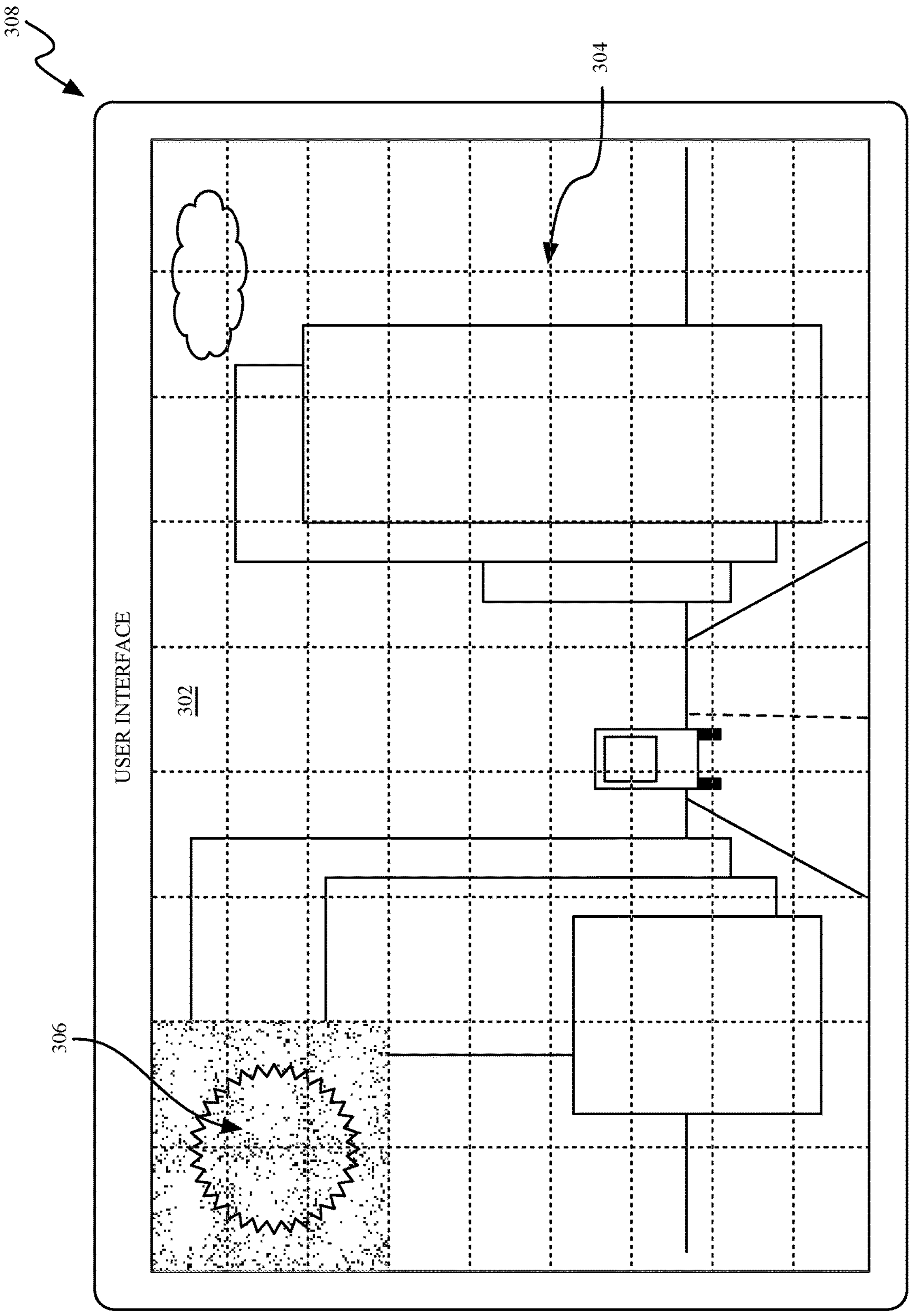
Figure 3C:
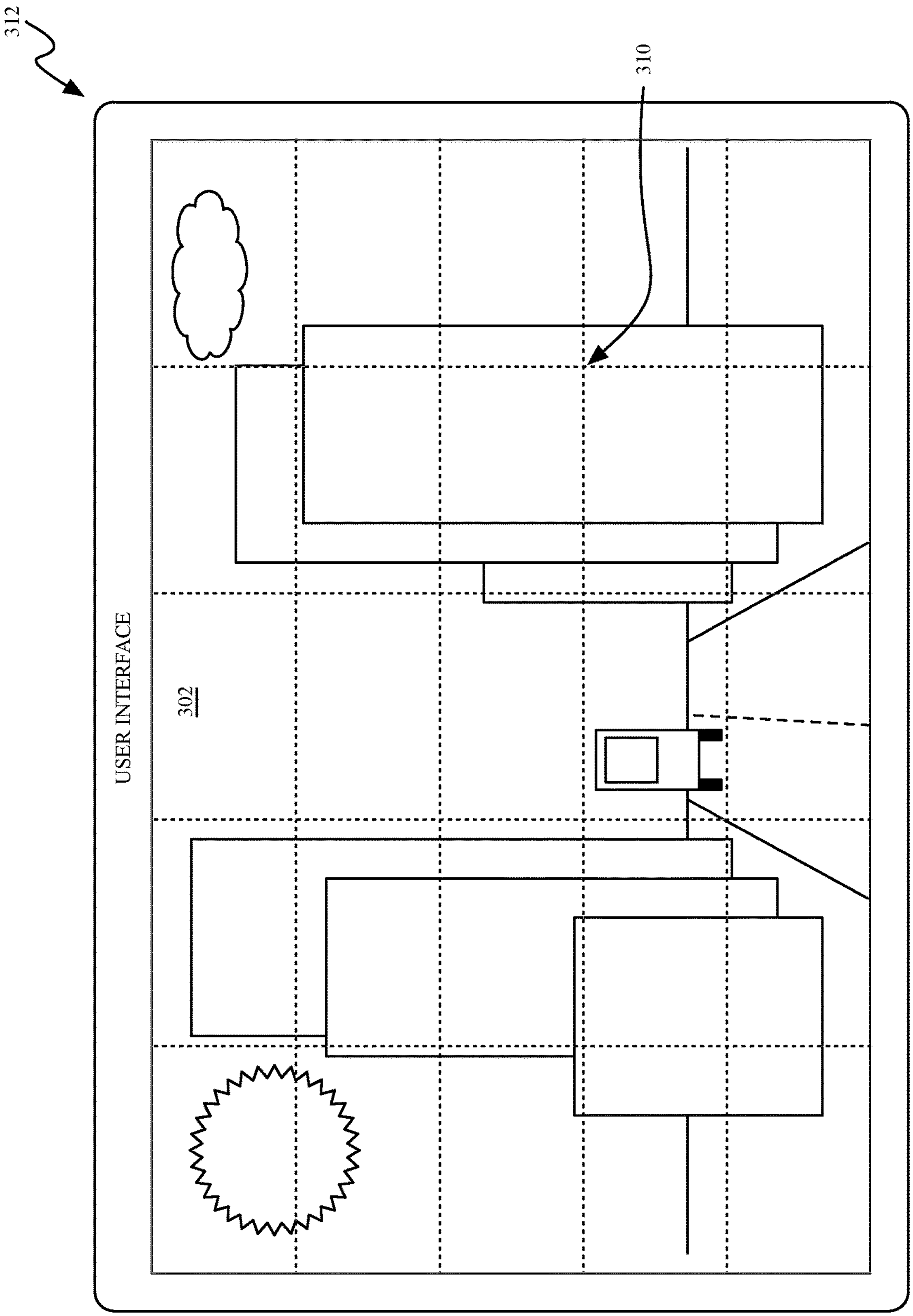

FIGS. 3A-3C illustrate a series of user interfaces showing an example video frame with image grid operations applied. Although a video frame 302 is shown in FIGS. 3A-3C, the image grid may be applied to any type of image.

FIG. 3A illustrates a user interface 300 in which a video frame 302 is displayed. The user interface 300 has an image grid 304 overlaid upon the video frame 302, with the image grid 304 having a particular aspect ratio and including a certain number of cells. Each of the cells is separated by vertical and horizontal gridlines in the image grid 304.

In one example, the system may receive user input that specifies a selection of a subset of cells of the image grid 304. In a further example, the user input may also specify a modification to a display characteristic for the video frame 302. In this example, responsive to receiving the user input, the system modifies a first portion of the frame 302 corresponding the selected subset of cells without modifying other portions of the frame 302 that correspond to cells of the image grid 304 that were not selected by the user input.

In another example, the system may be configured to determine whether any portion of the video frame 302 meets one or more annotation criteria. The annotation criteria may be selected from any image characteristic, property, or aspect capable of being detected. If a portion of the video frame 302 meets or exceeds the annotation criteria, the system determines a subset of cells of the image grid 304 that correspond to the portion of the video frame 302 that meets or exceeds the annotation criteria.

For example, assume that the sun has caused overexposure in the upper left corner of the video frame 302. In this example, the cells of the image grid 304 in the upper left corner of the image grid 304 would be selected for annotation.

FIG. 3B illustrates a user interface 308 in which the video frame 302 is displayed with the portion of the video frame 302, corresponding to the subset of cells 306, annotated to indicate that this portion of the video frame 302 meets or exceeds the annotation criteria. In the example, this portion in the upper left corner of the video frame 302 is overexposed and annotated, according to the subset of cells 306, to indicate this overexposure with a darkening effect. In addition, the system refrains from overlaying the annotation on the remaining portion of the frame 302 that does not meet the annotation criteria.

Any image characteristic may be used, alone or in combination with other image characteristics, to specify criteria which leads to annotation of the video frame when met or exceeded. Moreover, the annotation may take any form, such as highlighting, darkening, lightening, zebra patterns, inverse coloring, etc.

When user input specifies which cells of the image grid 304 are to be annotated, the system will annotate the portion of the video frame 302 that corresponds to the selected cells (in FIG. 3B, cells 306 would have been selected by the user).

FIG. 3C illustrates a user interface 312 in which the video frame 302 is displayed with a second image grid 310 having a different aspect ratio than the image grid 304 used in FIGS. 3A-3B. In one approach, the aspect ratio of the image grid may be matched to the aspect ratio of the video frame 302. Moreover, the number of cells in the image grid 310 (shown as 25 cells) may be selected by the user, or automatically selected by the system to provide a balance between cell granularity and processing capacity of the system when analyzing and annotating the video frame.

Scene Removal

Figure 4A:
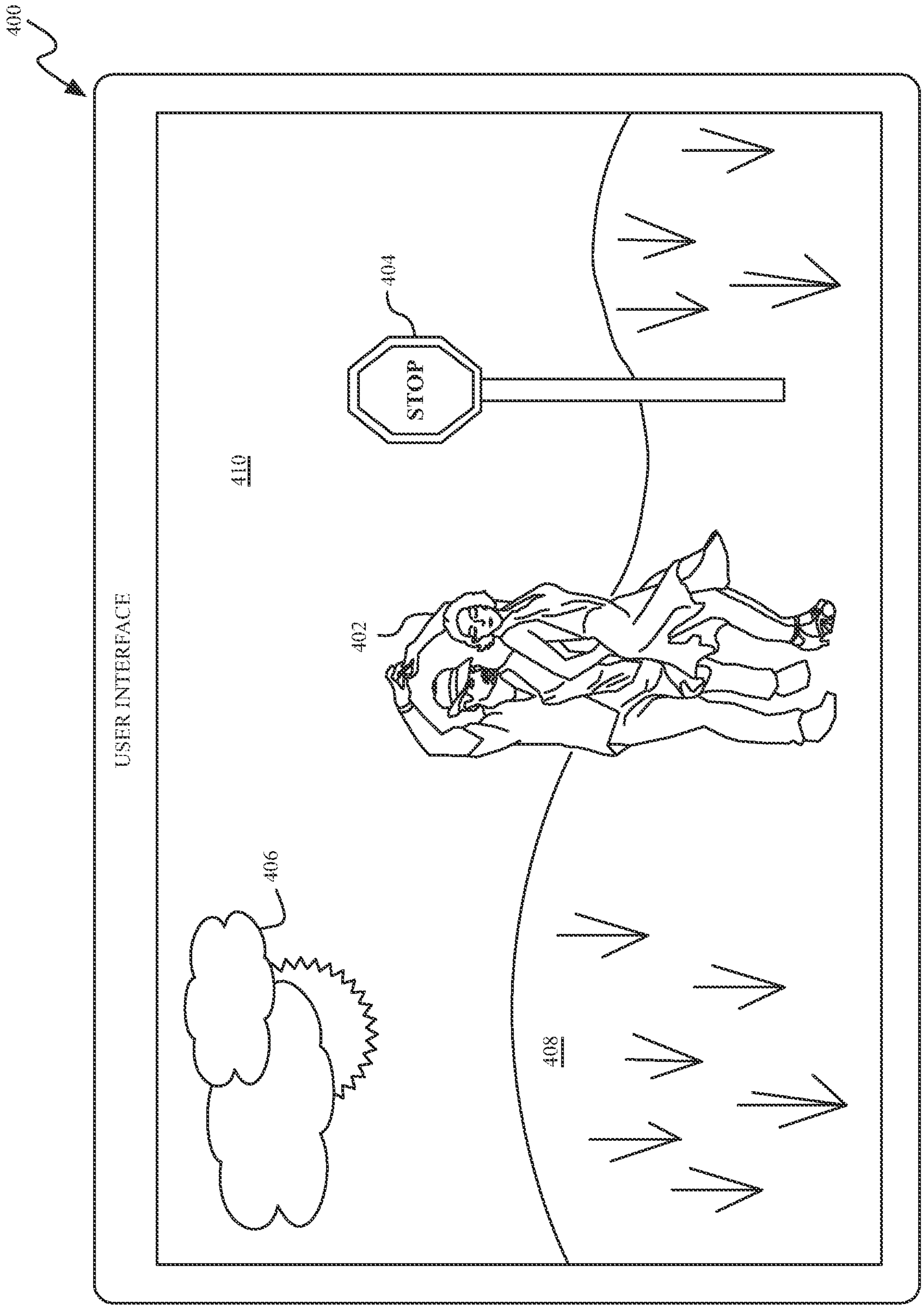
FIGS. 4A-4C illustrate a user interface displaying a series of example video frames for scene removal in a video editing application.
Figure 4B:
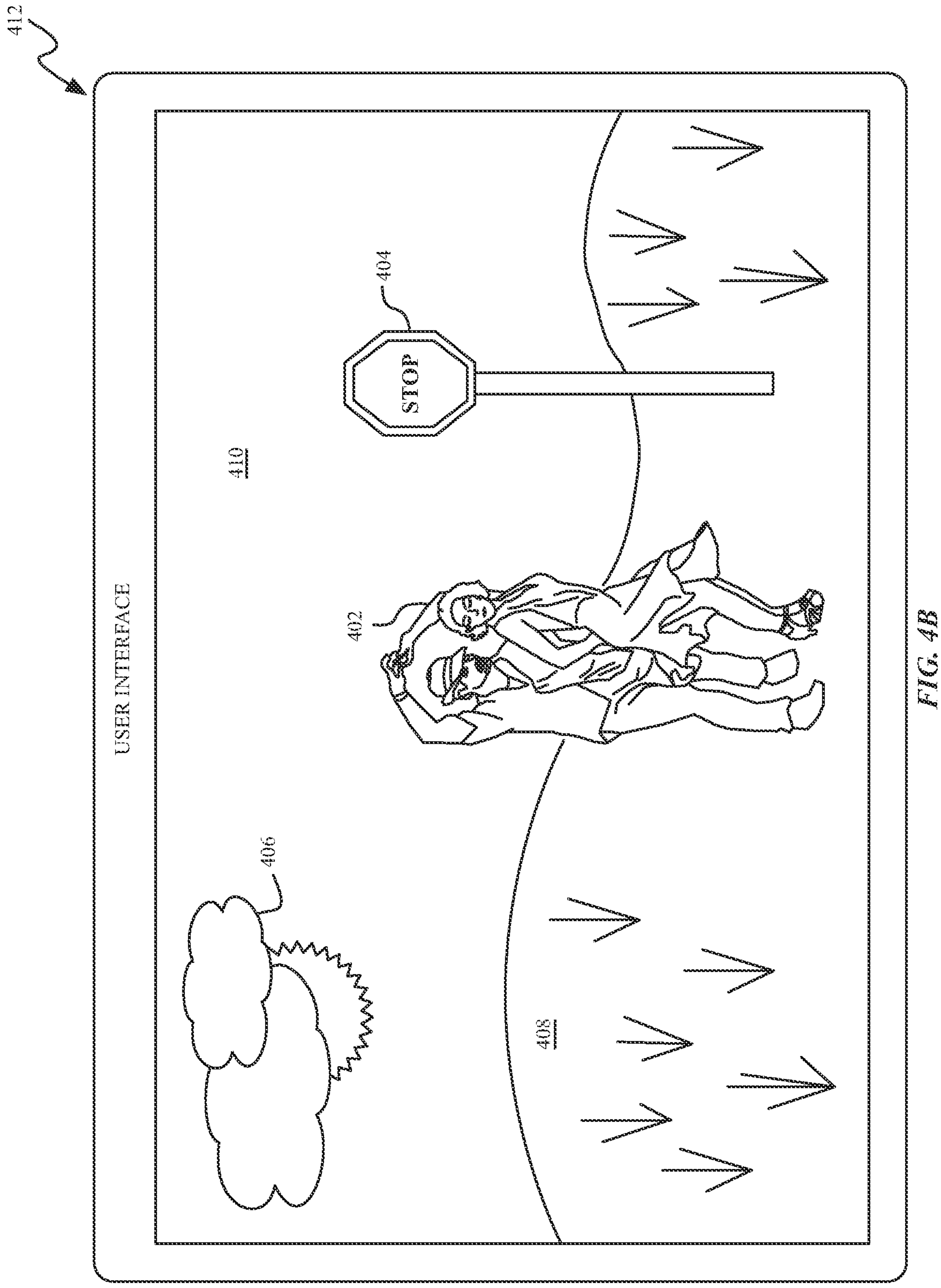
Figure 4C:
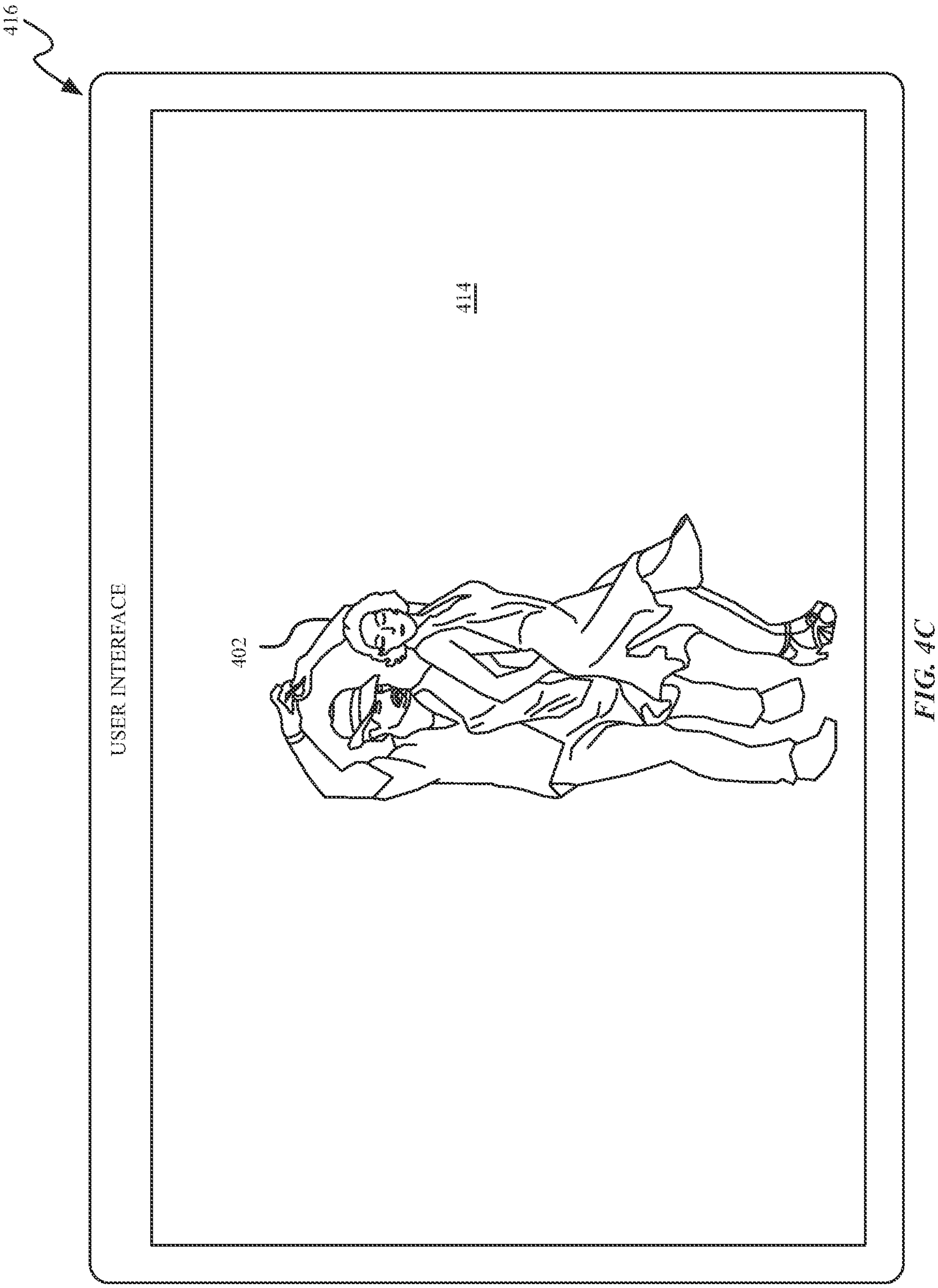

FIGS. 4A-4C illustrate a user interface displaying a series of example video frames for scene removal in a video editing application. FIG. 4A shows the user interface displaying a first video frame 400 that depicts a couple 402 dancing along with other entities, including a stop sign 404, a grassy hillside 408, a sun behind some clouds 406, and the sky 410. The system may calculate a reference frame, based on the entities detected in the video frame 400 or across a plurality of video frames, to use in removing a background from video frames obtained in real-time.

The reference frame may be used to generate a green screen effect to video frames in real-time where all entities that are substantially stationary or still are removed from the video frames, and any moving or non-stationary entity is shown.

FIG. 4B shows the user interface displaying a subsequent video frame 412 that depicts the couple 402 as they are dancing, resulting in their position being different from video frame 400. In video frame 412, the dancing couple 402 are moving, while the stop sign 404, grassy hillside 408, sun behind clouds 406, and the sky 410 have remained at least substantially still from video frame 400 to video frame 412. Based on this information, the system can determine that the stop sign 404, grassy hillside 408, sun behind clouds 406, and the sky 410 should be removed from the scene while displaying the dancing couple 402. In one example, to compute the reference frame, the dancing couple 402 may be removed while all stationary entities would remain.

FIG. 4C shows the user interface displaying a video frame 416 after applying scene removal. In video frame 416, the dancing couple 402 is shown with the background removed and replaced with void space 414.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 5:
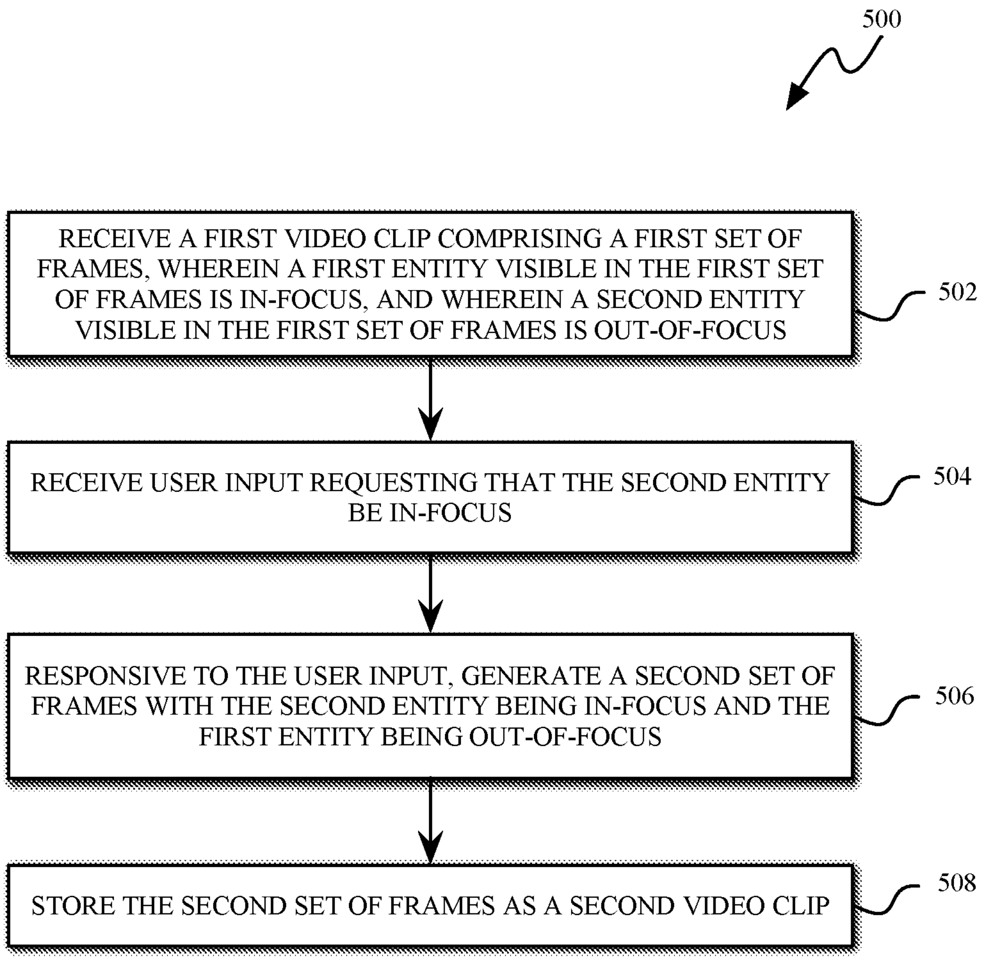
FIG. 5 is a flow diagram of an example process for cinematic video editing.

FIG. 5 is a flow diagram of an example process 500 for cinematic video editing. More or less operations than those shown and described herein may be included in process 500 in various approaches. For the remainder of the description of FIG. 5, process 500 will be described as being performed by a computing device having at least one hardware processor for performing the various operations.

In operation 502, the computing device receives a first video clip that includes a first set of frames. The first set of frames may number one or more frames, each frame including image data representing a scene captured by a camera device at a certain point in time. In the first set of frames, a first entity is visible and in-focus, indicating that a photographic representation of the first entity is visually clear and sharp, and a focal length of a virtual camera for the first set of frames is set to a depth of the first entity in the scene. Also, in the first set of frames, a second entity is visible and out-of-focus, indicating that a photographic representation of the second entity is lacking visual sharpness, blurry, fuzzy, or hazy. Moreover, the focal length of the virtual camera for the first set of frames may be set to a depth different from the depth of the second entity in the scene.

The various entities are discernible objects within the first set of frames. In some examples, the first and/or second entity may include one or more of the following: a person, a thing, an animal, flora (plants, trees, flowers, etc.), a manmade structure (e.g., buildings, roads, signs, manufactured goods, etc.), etc. Some potential entities may not be discernible in the first set of frames, such as being positioned in the background, being partially obscured by other object(s), lacking enough focus in the first set of frames to discern that the entity is different from surrounding areas, etc.

Although a video clip is described in process 500, any image data may be analyzed in process 500 for cinematic video editing, such as a video stream, animated movie or clip, still image, photograph, screenshot of a video, etc.

According to one embodiment, the computing device may store metadata in association with the second video clip. The metadata may include any relevant information about the first or second set of frames. Some example information to be stored as metadata may include information corresponding to the first and second entities, and which of the first and second entities is in-focus.

In operation 504, the computing device receives user input requesting that the second entity be in-focus. More than two entities may be present in the first set of frames, and more than one entity may be selected for putting in-focus by the user input.

The request may be received via a user interface presented by the computing device on a touchscreen display of the computing device, in an approach. The user input may include a touch input on the touchscreen device. The touch input may be a single tap or double tap contact above a graphical representation of the second entity on the touchscreen display, in an approach. According to another approach, the user may draw a shape around the graphical representation of the second entity using a swiping touch input on the touchscreen display to select the second entity.

In operation 506, the computing device generates a second set of frames with the second entity being in-focus and the first entity being out-of-focus responsive to the user input. the second set of frames may maintain all other aspects and entities of the scene unchanged from the first set of frames, except for adjusting the focus on the first and second entities. If other entities were selected by the user input for being in-focus or out-of-focus, these entities will have a focus adjusting in a respective manner in the second set of frames.

The computing device may apply one or more algorithms for adjusting the focus for specific entities within the first set of frames. For example, an algorithm may process the first and second entities on a pixel-by-pixel basis to adjust how each pixel is displayed in the second set of frames to cause a sharpness of the entity to be changed, as requested by the user.

In operation 508, the computing device stores the second set of frames as a second video clip. The second video clip may be stored to the same storage device as the first video clip, or to a different storage device.

In one or more embodiments, the computing device may determine, for each of the first set of frames, a set of image portions corresponding to the second entity. The set of image portions may be pixels of each of the first set of frames that represent and form the second entity. A tracking algorithm may be employed to discern which portions of each frame of the first set of frames corresponds to the second entity across the various frames.

In an approach, the computing device may sharpen the first set of image portions that correspond to the second entity to render the second entity in-focus. The sharpening may be applied on a pixel-by-pixel basis in one approach.

According to an approach, the computing device may determine, for each of the first set of frames, a set of image portions corresponding to the first entity. Based on this determination, the computing device may soften the first set of image portions corresponding to the first entity to render the first entity out-of-focus.

In an approach, the computing device may soften the first set of image portions that correspond to the first entity to render the first entity out-of-focus. The softening may be applied on a pixel-by-pixel basis in one approach.

In one embodiment, the computing device may receive metadata associated with the first video clip. The metadata may include any relevant information about the first set of frames. In an approach, the metadata may include information corresponding to the second entity. When metadata is received in association with the first set of frames, the computing device may generate the second set of frames using the metadata.

In a further approach, the metadata may be recorded in a stream concurrently with recording of the first video clip. In one or more approaches, the stream may be stored separately from the first video clip.

According to one embodiment, a third entity may be visible in the first set of frames and be out-of-focus. The computing device may generate a third set of frames with the third entity being in-focus and the first and second entities being out-of-focus, such as in response to user input requesting that the third entity be in-focus. Moreover, the computing device may store the third set of frames as a third video clip. The first, second, and/or third video clips may be stored in association with one another, or separately with no association existing therebetween.

In an approach, the computing device may store metadata in association with the third video clip. The metadata may include information corresponding to one or more of the first, second, and third entities. It may also include which of the first, second, and third entities is in-focus.

Figure 6:
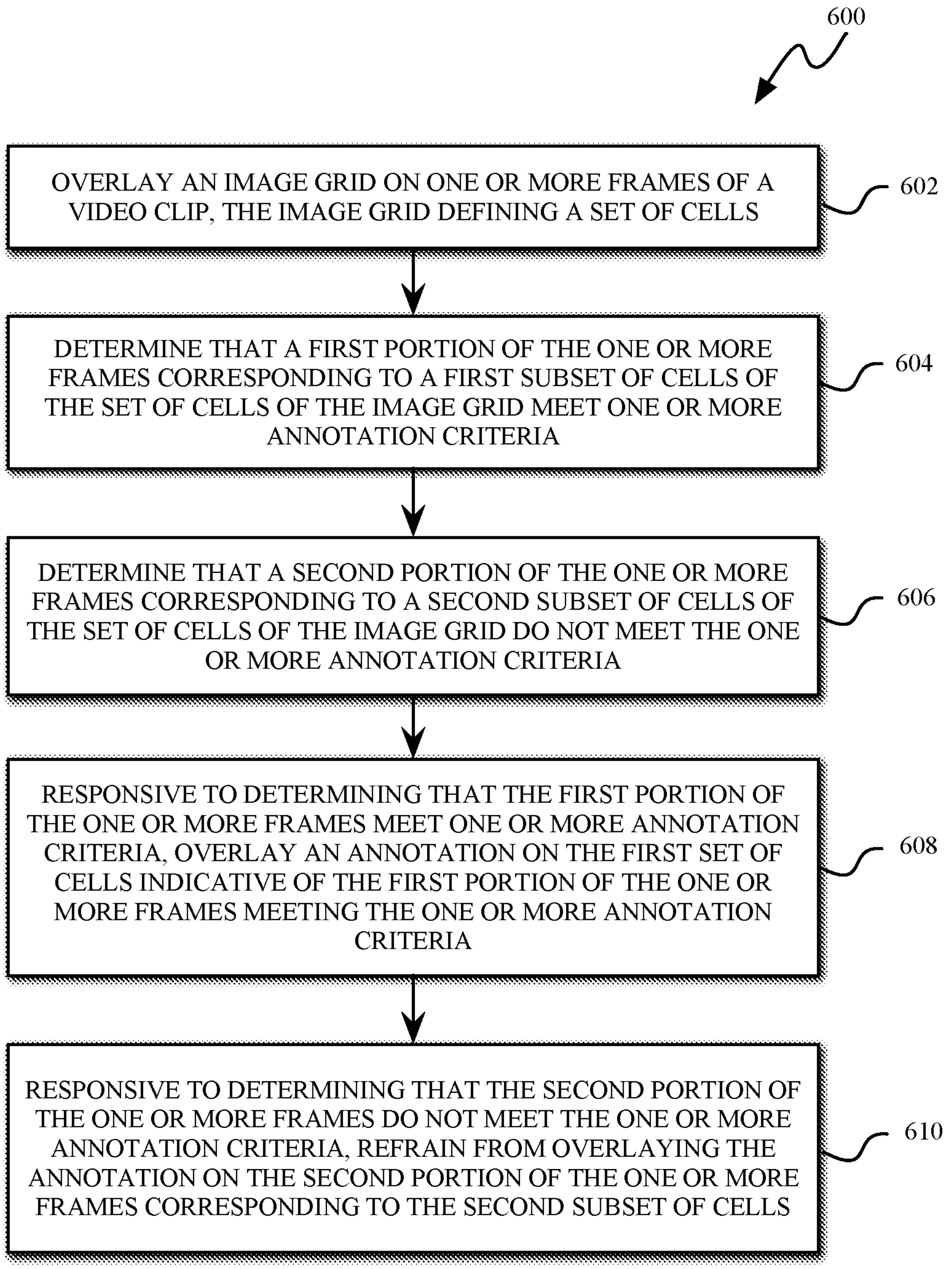
FIG. 6 is a flow diagram of an example process for the use of image grid operations in a video editing application.

FIG. 6 is a flow diagram of an example process 600 for the use of image grid operations in a video editing application. More or less operations than those shown and described herein may be included in process 600 in various approaches. For the remainder of the description of FIG. 6, process 600 will be described as being performed by a computing device having at least one hardware processor for performing the various operations.

In operation 602, the computing device overlays an image grid on one or more frames of a video clip (e.g., the image grid is displayed overlaid on at least one frame of a video clip that is displayed on a touchscreen display). The image grid defines a set of cells, each cell being defined by a portion of one or two vertical gridlines and one or two horizontal gridlines. Cells positioned on an edge of the image grid may be defined a gridline on one side, and an edge of the frame on the other side.

A shape of the cells may be selected by the user or automatically determined by the computing device. The determination may be based on an aspect ratio of the frames, and/or a number of cells that are displayed (which is based on the number of horizontal and vertical gridlines in the image grid).

In one embodiment, the computing device may receive user input that selects an aspect ratio for the cells of the image grid (e.g., 1:1, 4:3, 16:9, etc.). Based on this selected aspect ratio and responsive to the user input, the computing device overlays the image grid such that the cells of the image grid have the selected aspect ratio.

Moreover, the number of cells, and consequently the number of vertical and horizontal gridlines in the image grid, may be selected by the user or automatically determined by the computing device. This determination may be based on the aspect ratio for each cell in one approach.

The gridlines of the image grid may be solid or dashed, and may have an appearance that is faint or bold. In one embodiment, the color and/or appearance of portions of the gridlines may be determined based on an appearance of a portion of the frame over which the gridlines are placed. For example, yellow gridlines will not be visible in front of a yellow school bus, and therefore may have a different color appearance (e.g., blue, darker yellow, black, white, etc.), at least over portions of the gridlines that appear over the school bus.

In operation 604, the computing device determines that a first portion of the one or more frames corresponding to a first subset of cells of the image grid meet one or more annotation criteria.

In an approach, the annotation criteria are based on image characteristics of the frames, such as exposure, brightness, contrast, color saturation, focus, etc. A user may select the annotation criteria in one approach, such as via touch input received on the touchscreen display (e.g., selection of one or more image characteristics from a menu, list, etc.).

Any image characteristic may be used, alone or in combination with other image characteristics, to specify criteria which leads to annotation of the video frame when met or exceeded.

In an embodiment, the computing device may scan the frames to determine portions of the frames which include image characteristics which would cause a captured image to suffer from one or more known image flaws, such as overbrightness, low light, overexposure, underexposure, out-of-focus subject(s), color oversaturation, etc. In this approach, the computing device may select each portion of the frames which suffers from these known image flaws and present distinct annotations for each corresponding portion of the frames suffering from the respective image flaw.

In operation 606, the computing device determines that a second portion of the one or more frames corresponding to a second subset of cells of the image grid do not meet the one or more annotation criteria.

In an embodiment, when the computing device scans the frames to determine portions of the frames which include image characteristics which would cause a captured image to suffer from one or more known image flaws, the computing device may also determine that other portions of the frames do not meet the annotation criteria (because they do not represent portions of the frames that suffer from any of the known image flaws). In this approach, the computing device may select each portion of the frames which does not suffer from these known image flaws and refrain from annotating the corresponding portions of the frames.

In operation 608, the computing device overlays an annotation on the first set of cells of the image grid indicative of the first portion of the one or more frames meeting the one or more annotation criteria responsive to determining that the first portion of the one or more frames meet the one or more annotation criteria.

In one or more embodiments, the annotation may have any form or appearance, such as highlighting, darkening, lightening, zebra patterns, inverse coloring, etc. In an approach, the user may specify the annotation, and may further specify distinct annotations for different portions of the frames which meet or exceed different annotation criteria. For example, overexposed portions of the frames may be annotated with a zebra pattern, while out-of-focus portions of the frames may be annotated with a semi-transparent colored overlay (such as light yellow, light orange, etc.).

In operation 610, the computing device refrains from overlaying the annotation on the second portion of the one or more frames corresponding to the second subset of cells responsive to determining that the second portion of the one or more frames do not meet the one or more annotation criteria. Refraining from overlaying the annotation on the second portion of the frames results in the second portion of the frames being displayed as originally captured, unless these portions meet another annotation criteria, in which case a different annotation overlay may be displayed upon these portions of the frames.

In one embodiment, the computing device may detect that a first subset of the frames has a first aspect ratio that is different from a second aspect ratio for a second subset of the frames. In this embodiment, the computing device adjusts the overlaid image grid such that the set of cells have the first aspect ratio when overlaid on the first subset of the frames, and the set of cells have the second aspect ratio when overlaid on the second subset of the one or more frames. In this way, the image grid may dynamically change the size and shape of the cells to match a size and aspect ratio of the frame(s).

In several embodiments, the annotation criteria may include overexposure in which the annotation overlaid on the first set of cells is a zebra pattern defined by diagonally oriented stripes. The stripes may be white, black, yellow, or some other color selected by the user or determined by the computing device based on a majority of the background color of the frame under the annotation to provide best viewability of the annotation. Moreover, in an approach, a thickness of the lines and spacing between the lines may be selected to allow visibility of the portions of the frame behind the annotation.

Figure 7:
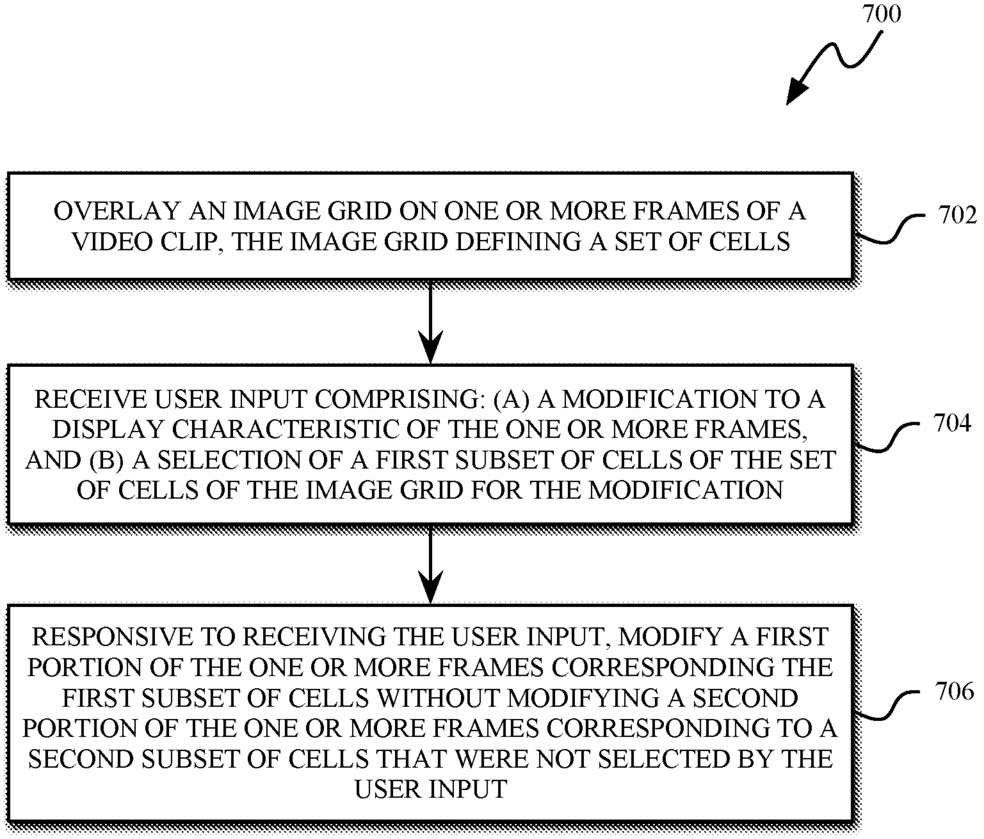
FIG. 7 is a flow diagram of an example process for the use of image grid operations in a video editing application.

FIG. 7 is a flow diagram of an example process for the use of image grid operations in a video editing application. More or less operations than those shown and described herein may be included in process 700 in various approaches. For the remainder of the description of FIG. 7, process 700 will be described as being performed by a computing device having at least one hardware processor for performing the various operations.

In operation 702, the computing device overlays an image grid on one or more frames of a video clip (e.g., the image grid is displayed overlaid on at least one frame of a video clip that is displayed to a touchscreen display). The image grid defines a set of cells, each cell being defined by a portion of one or two vertical gridlines and one or two horizontal gridlines. Cells positioned on an edge of the image grid may be defined a gridline on one side, and an edge of the frame on the other side.

A shape of the cells may be selected by the user or automatically determined by the computing device. The determination may be based on an aspect ratio of the frames, and/or a number of cells that are displayed (which is based on the number of horizontal and vertical gridlines in the image grid).

In operation 704, the computing device receives user input. In an approach, the user input may specify a modification to a display characteristic of the one or more frames. In an approach, the user input may specify a selection of a first subset of cells of the set of cells of the image grid for the modification. In another approach, the user input may include both the modification and the selection of cells to apply the modification.

The display characteristic may be any detectable aspect of the image(s) in the frames. In one or more embodiments, the display characteristic of the frames may include, but is not limited to, one or more of contrast, brightness, white balance, color, luminance, and tone.

In operation 706, responsive to receiving the user input, the computing device modifies a first portion of the frames corresponding to the first subset of cells without modifying a second portion of the frames corresponding to a second subset of cells that were not selected by the user input.

For example, a user may specify that the cells along a bottom of each frame should have the contrast increased by a particular amount or to match a certain contrast value. In this example, the computing device may increase the contrast by the particular amount, or match the contrast to the certain contrast value, for each portion of the frames which correspond to the selected cells of the image grid.

In another example, a user may specify that cells in a center of an image should have the sharpness decreased by a particular amount or to match a certain sharpness value. In this example, the computing device may decrease the sharpness by the particular amount, or match the sharpness to the certain sharpness value, for each portion of the frames which correspond to the selected center cells of the image grid.

In one embodiment, the computing device may receive user input that selects an aspect ratio for the cells of the image grid (e.g., 1:1, 4:3, 16:9, etc.). Based on this selected aspect ratio, the computing device overlays the image grid such that each of the cells of the image grid have the selected aspect ratio.

Moreover, the number of cells, and consequently the number of vertical and horizontal gridlines in the image grid, may be selected by the user or automatically determined by the computing device. This determination may be based on the aspect ratio for each cell in one approach.

For example, if a user selects an aspect ratio of 16:9, the vertical and horizontal gridlines of the image grid will be positioned in a way that causes each cell of the image grid to have an aspect ratio of 16:9. When viewing an image grid having cell aspect from the aspect ratio of the displayed frame(s), one or more cells of the image grid may vary from the selected aspect ratio, such as a central cell, edge cells, etc.

In an embodiment, the computing device detects that a first subset of the frames of the video clip have a first aspect ratio that is different from a second aspect ratio for a second subset of the frames. In other words, some frames have a different aspect ratio than some other frames of the video clip. In this embodiment, the computing device may dynamically adjust the overlaid image grid such that the set of cells have the first aspect ratio when overlaid on the first subset of the frames when the first subset of frames is displayed, and the set of cells have the second aspect ratio when overlaid on the second subset of the frames when the second subset of frames is displayed. This allows the image grid to dynamically adjust the cells' aspect ratio depending on the aspect ratio of the displayed frame(s).

Figure 8:
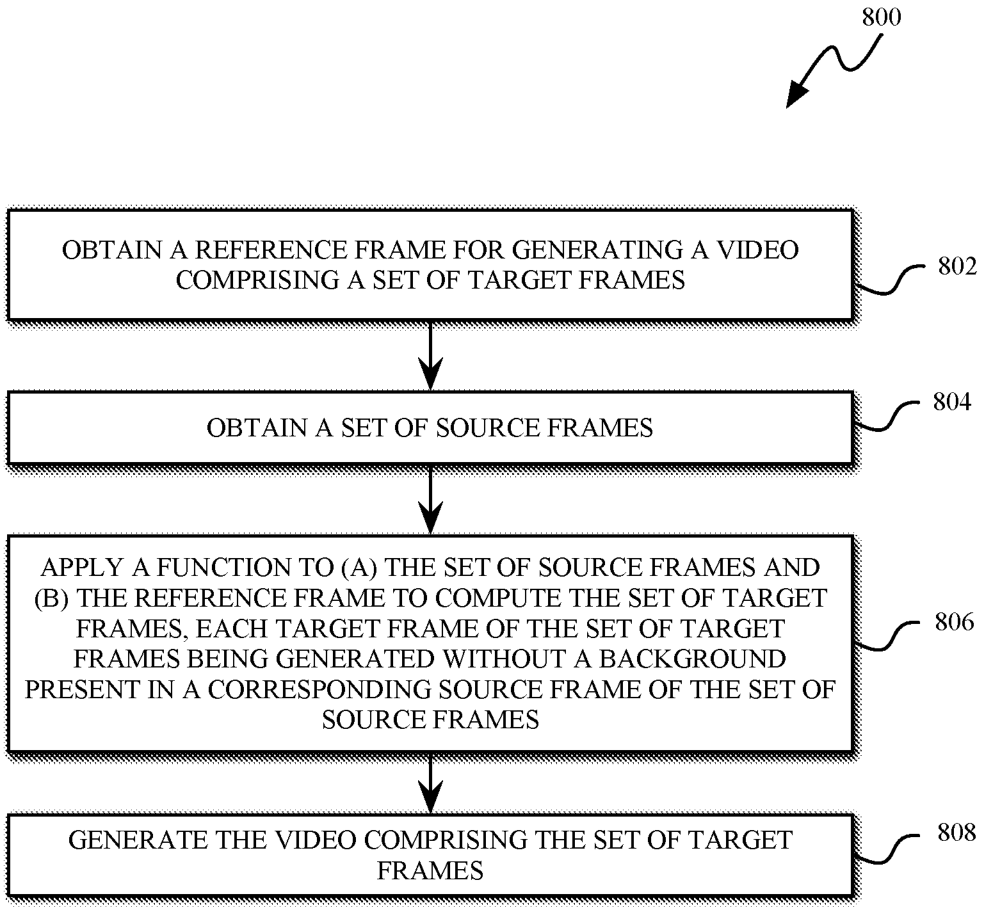
FIG. 8 is a flow diagram of an example process for scene removal in a video editing application.

FIG. 8 is a flow diagram of an example process for scene removal in a video editing application. More or less operations than those shown and described herein may be included in process 800 in various approaches. For the remainder of the description of FIG. 8, process 800 will be described as being performed by a computing device having at least one hardware processor for performing the various operations.

In operation 802, the computing device obtains a reference frame for generating a video that will include a set of target frames. The reference frame may indicate which portions of a frame should be removed from view and replaced with transparent portion(s).

In an approach, obtaining the reference frame may include computing the reference frame based on a first frame of the set of source frames, or in another approach the reference frame may be computed based on multiple frames of the set of source frames, such as by calculating an average or baseline set of stationary entities form the multiple frames that are averaged together to form the reference frame.

According to one embodiment, the computing device determines pixel data that is consistent (e.g., unchanging, or within a threshold amount of limited change) across a subset of the set of source frames. Based on this consistent pixel data, the computing device computes the reference frame. The limited amount of change may be determined by the computing device to allow for small or one-off movements of the background entities, so that wind, breezes, insects, or other uncontrollable features of video recording do not adversely affect the user's ability to capture a stationary background.

In operation 804, the computing device obtains a set of source frames. The set of source frames may be obtained from a camera device, video recording device, or image capture device comprised by the computing device. In another approach, the set of source frames may be received by the computing device from a secondary device in electrical communication with the computing device.

The set of source frames, in an embodiment, show a consistent scene where motion and movement are limited to one or more intentionally moving entities within the field of view of the frames, while all other entities remain stationary or within an allowable and limited threshold amount of movement.

In operation 806, the computing device applies one or more functions and/or algorithms to the set of source frames and the reference frame. Based on applying the function(s) and/or algorithm(s), the computing device computes the set of target frames for the video. Each target frame of the set of target frames is generated to exclude a background that is present in a corresponding source frame of the set of source frames.

In one embodiment, applying the function may include applying the function to a particular frame of the set of source frames, along with the reference frame, to generate a corresponding particular frame of the set of target frames. The corresponding particular frames together form the set of target frames.

In this embodiment, the function may include subtracting the reference frame from the particular frame of the set of source frames to generate the corresponding particular frame of the set of target frames. Subtracting in this embodiment would remove all stationary entities from the particular frame, which leaves only the entities that are in motion.

In this way, the computing device removes any stationary entities (e.g., the background) from the frames, while leaving any moving entities that are in motion for any of the frames in the set of source frames.

In operation 808, the computing device generates the video to include the set of target frames.

In a further embodiment, operation 808 is performed in real time while the set of source frames are captured, to allow real time green screen effects to be implemented in a video stream.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Scene Removal Embodiments

In various embodiments a user may selectively remove aspects of a scene using touch input as described below.

1. A non-transitory computer readable medium comprising one or more sequences of instructions which, when executed by one or more processors, cause the one or more processors to perform operations comprising:
   - obtaining a reference frame for generating a video comprising a set of target frames; obtaining a set of source frames;
   - applying a function to (a) the set of source frames and (b) the reference frame to compute the set of target frames, each target frame of the set of target frames being generated without a background present in a corresponding source frame of the set of source frames; and
   - generating the video comprising the set of target frames.

2. The non-transitory computer readable medium as recited in claim 1, wherein applying the function comprises applying the function to a particular frame of the set of source frames and the reference frame to generate a corresponding particular frame of the set of target frames.

3. The non-transitory computer readable medium as recited in claim 2, wherein the function comprises subtracting the reference frame from the particular frame of the set of source frames to generate the corresponding particular frame of the set of target frames.

4. The non-transitory computer readable medium as recited in claim 1, wherein obtaining the reference frame comprises computing the reference frame based on a first frame of the set of source frames.

5. The non-transitory computer readable medium as recited in claim 1, wherein obtaining the reference frame comprises:

determining pixel data that is consistent across a subset of the set of source frames; and computing the reference frame based on the consistent pixel data.

6. A system comprising:

one or more processors; and a non-transitory computer readable medium comprising one or more sequences of instructions which, when executed by the one or more processors, cause the one or more processors to perform operations comprising:

obtaining a reference frame for generating a video comprising a set of target frames;

obtaining a set of source frames;

applying a function to (a) the set of source frames and (b) the reference frame to compute the set of target frames, each target frame of the set of target frames being generated without a background present in a corresponding source frame of the set of source frames; and generating the video comprising the set of target frames.

7. A method comprising:

obtaining a reference frame for generating a video comprising a set of target frames;

obtaining a set of source frames;

applying a function to (a) the set of source frames and (b) the reference frame to compute the set of target frames, each target frame of the set of target frames being generated without a background present in a corresponding source frame of the set of source frames; and generating the video comprising the set of target frames.

Image Grid Operation Embodiments

In various embodiments image grid operations may be performed in a video editing application as described below.

1. A non-transitory computer readable medium comprising one or more sequences of instructions which, when executed by one or more processors, cause the one or more processors to perform operations comprising:

overlaying an image grid on one or more frames of a video clip, the image grid defining a set of cells;

receiving user input comprising: (a) a modification to a display characteristic of the one or more frames, and (b) a selection of a first subset of cells of the set of cells of the image grid for the modification; and responsive to receiving the user input, modifying a first portion of the one or more frames corresponding to the first subset of cells without modifying a second portion of the one or more frames corresponding to a second subset of cells that were not selected by the user input.

2. The non-transitory computer readable medium as recited in claim 1, wherein the operations further comprise:

receiving user input to select an aspect ratio for the set of cells of the image grid; and responsive to the user input, overlaying the image grid such that the set of cells have the selected aspect ratio.

3. The non-transitory computer readable medium as recited in claim 1, wherein the operations further comprise:

detecting that a first subset of the one or more frames of the video clip has a first aspect ratio that is different from a second aspect ratio for a second subset of the one or more frames; and adjusting the overlaid image grid such that: (a) the set of cells have the first aspect ratio when overlaid on the first subset of the one or more frames, and (b) the set of cells have the second aspect ratio when overlaid on the second subset of the one or more frames.

4. The non-transitory computer readable medium as recited in claim 1, wherein the display characteristic of the one or more frames is selected from a group comprising: contrast, brightness, white balance, color, luminance, and tone.

5. A system comprising:

one or more processors; and a non-transitory computer readable medium comprising one or more sequences of instructions which, when executed by the one or more processors, cause the one or more processors to perform operations comprising:

overlaying an image grid on one or more frames of a video clip, the image grid defining a set of cells;

receiving user input comprising: (a) a modification to a display characteristic of the one or more frames, and (b) a selection of a first subset of cells of the set of cells of the image grid for the modification; and responsive to receiving the user input, modifying a first portion of the one or more frames corresponding the first subset of cells without modifying a second portion of the one or more frames corresponding to a second subset of cells that were not selected by the user input.

6. A method comprising:

overlaying an image grid on one or more frames of a video clip, the image grid defining a set of cells;

receiving user input comprising: (a) a modification to a display characteristic of the one or more frames, and (b) a selection of a first subset of cells of the set of cells of the image grid for the modification; and responsive to receiving the user input, modifying a first portion of the one or more frames corresponding the first subset of cells without modifying a second portion of the one or more frames corresponding to a second subset of cells that were not selected by the user input.

7. A non-transitory computer readable medium comprising one or more sequences of instructions which, when executed by one or more processors, cause the one or more processors to perform operations comprising:

overlaying an image grid on one or more frames of a video clip, the image grid defining a set of cells;

determining that a first portion of the one or more frames corresponding to a first subset of cells of the set of cells of the image grid meet one or more annotation criteria;

determining that a second portion of the one or more frames corresponding to a second subset of cells of the set of cells of the image grid do not meet the one or more annotation criteria;

responsive to determining that the first portion of the one or more frames meet the one or more annotation criteria, overlaying an annotation on the first set of cells indicative of the first portion of the one or more frames meeting the one or more annotation criteria; and responsive to determining that the second portion of the one or more frames do not meet the one or more annotation criteria, refraining from overlaying the annotation on the second portion of the one or more frames corresponding to the second subset of cells.

8. The non-transitory computer readable medium as recited in claim 7, wherein the operations further comprise:

detecting that a first subset of the one or more frames of the video clip has a first aspect ratio that is different from a second aspect ratio for a second subset of the one or more frames; and adjusting the overlaid image grid such that: (a) the set of cells have the first aspect ratio when overlaid on the first subset of the one or more frames, and (b) the set of cells have the second aspect ratio when overlaid on the second subset of the one or more frames.

9. The non-transitory computer readable medium as recited in claim 7, wherein the operations further comprise:

receiving user input to select an aspect ratio for the set of cells of the image grid; and responsive to the user input, overlaying the image grid such that the set of cells have the selected aspect ratio.

10. The non-transitory computer readable medium as recited in claim 7, wherein the one or more annotation criteria are based on image characteristics selected from a group comprising: exposure, brightness, contrast, color saturation, and focus.

11. The non-transitory computer readable medium as recited in claim 7, wherein the one or more annotation criteria comprises overexposure, and wherein the annotation overlaid on the first set of cells is a zebra pattern comprising diagonally oriented stripes.

12. A system comprising:

one or more processors; and a non-transitory computer readable medium comprising one or more sequences of instructions which, when executed by the one or more processors, cause the one or more processors to perform operations comprising:

overlaying an image grid on one or more frames of a video clip, the image grid defining a set of cells;

determining that a first portion of the one or more frames corresponding to a first subset of cells of the set of cells of the image grid meet one or more annotation criteria;

determining that a second portion of the one or more frames corresponding to a second subset of cells of the set of cells of the image grid do not meet the one or more annotation criteria;

responsive to determining that the first portion of the one or more frames meet the one or more annotation criteria, overlaying an annotation on the first set of cells indicative of the first portion of the one or more frames meeting the one or more annotation criteria; and responsive to determining that the second portion of the one or more frames do not meet the one or more annotation criteria, refraining from overlaying the annotation on the second portion of the one or more frames corresponding to the second subset of cells.

13. A method comprising:

overlaying an image grid on one or more frames of a video clip, the image grid defining a set of cells;

determining that a first portion of the one or more frames corresponding to a first subset of cells of the set of cells of the image grid meet one or more annotation criteria;

determining that a second portion of the one or more frames corresponding to a second subset of cells of the set of cells of the image grid do not meet the one or more annotation criteria;

responsive to determining that the first portion of the one or more frames meet one or more annotation criteria, overlaying an annotation on the first set of cells indicative of the first portion of the one or more frames meeting the one or more annotation criteria; and responsive to determining that the second portion of the one or more frames do not meet the one or more annotation criteria, refraining from overlaying the annotation on the second portion of the one or more frames corresponding to the second subset of cells.

Privacy

As described above, one aspect of the present technology is the gathering and use of data available from various sources to improve implementation of the scene removal, cinematic video editing, and image grid operations in a video editing application. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content and suggestions that are of greater interest to the user in the context of the scene removal, cinematic video editing, and image grid operations for the video editing application. Accordingly, use of such personal information data enables users to control the delivered content for use in these functions. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of the scene removal, cinematic video editing, and image grid operations for the video editing application, the present technology can be configured to allow users to select to "opt in" or "opt out" of participation in the collection of personal information data during registration for services or anytime thereafter. In another example, users can select not to provide mood-associated data for the scene removal, cinematic video editing, and image grid operations in the video editing application. In yet another example, users can select to limit the length of time mood-associated data is maintained or entirely prohibit the development of a baseline mood profile, if such mood-associated data is deemed unnecessary for providing the scene removal, cinematic video editing, and image grid operations in the video editing application. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the scene removal, cinematic video editing, and image grid operations in the video editing application may be based on non-personal information data or a bare minimum amount of personal information, such as the videos and media being requested and/or captured by the device associated with a user, other non-personal information available to the video editing application, or publicly available information.

Example System Architecture

Figure 9:
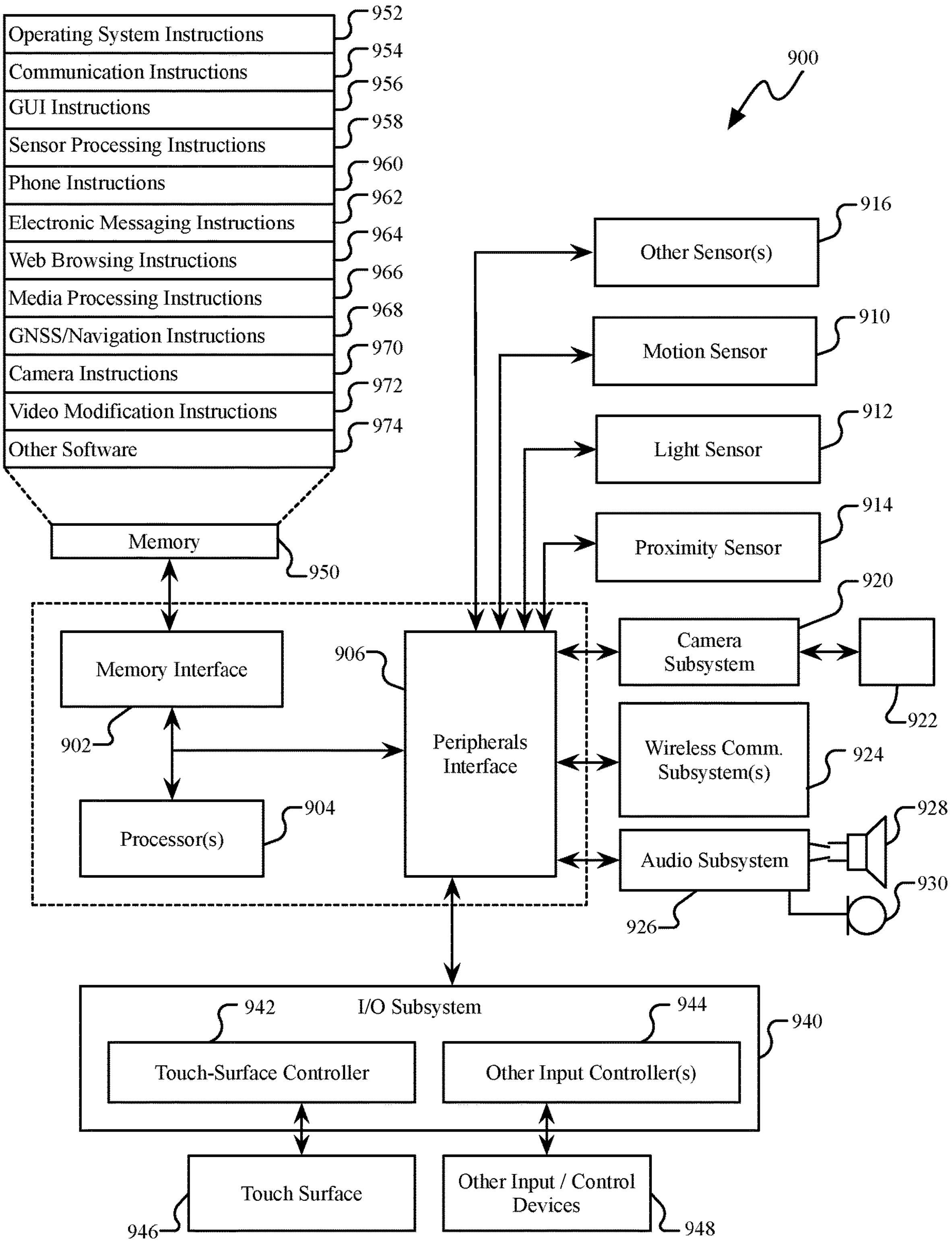
FIG. 9 is a block diagram of an example computing device that can implement the features and processes of FIGS. 1-8.

FIG. 9 is a block diagram of an example computing device 900 that can implement the features and processes of FIGS. 1-8. The computing device 900 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the computing device 900 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, magnetometer or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the computing device 900 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voiceprinting and voice authentication, for example.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™.

The memory interface 902 can be coupled to memory 950. The memory 950 can include high-speed random-access memory and/or non-volatile memory, such as one or more magnetic disk storage devices, one or more optical storage devices, and/or flash memory (e.g., NAND, NOR). The memory 950 can store an operating system 952, such as Darwin, RTXC. LINUX, UNIX, OS X, WINDOWS, or an embedded operating system such as Vx Works.

The operating system 952 can include instructions for handling basic system services and for performing hardware dependent tasks. In some implementations, the operating system 952 can be a kernel (e.g., UNIX kernel). In some implementations, the operating system 952 can include instructions for performing scene removal, cinematic video editing, and image grid operations for a video editing application. For example, operating system 952 can implement the scene removal, cinematic video editing, and image grid operations as described with reference to FIGS. 1-8.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store software instructions 972 to facilitate other processes and functions, such as the scene removal, cinematic video editing, and image grid operations as described with reference to FIGS. 1-8.

The memory 950 can also store other software instructions 974, such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

What is claimed is:

1. A non-transitory computer readable medium comprising one or more sequences of instructions which, when executed by one or more processors, cause the one or more processors to perform operations comprising:

receiving a first video clip comprising a first set of frames, wherein the first video clip is generated by concurrently recording a first entity and a second entity using an image capture device;

wherein the first entity is (a) displayed within each of the first set of frames and (b) is in-focus in each of the first set of frames, and wherein the second entity is (a) displayed within each of the first set of frames and (b) is out-of-focus in each of the first set of frames;

receiving user input requesting a second video clip where the second entity is in-focus;

responsive to receiving the user input, generating a second video clip comprising a second set of frames with:

the second entity being displayed in-focus within each of the second set of frames; and the first entity being displayed out-of-focus within each of the second set of frames;

wherein generating the second video clip comprises:

determining, for each of the first set of frames, a first set of image portions corresponding to the first entity; and softening the first set of image portions corresponding to the first entity to render the first entity out-of-focus;

determining, for each of the first set of frames, a second set of image portions corresponding to the second entity;

sharpening the second set of image portions corresponding to the second entity to render the second entity in-focus; and storing the second video clip.

2. The non-transitory computer readable medium as recited in claim 1, wherein storing the second set of frames as the second video clip comprises storing metadata in association with the second video clip, the metadata comprising information corresponding to: (a) the first and second entities, and (b) which of the first and second entities is in-focus.

3. The non-transitory computer readable medium as recited in claim 1, wherein the operations further comprise:

receiving metadata associated with the first video clip, the metadata comprising information corresponding to the second entity, wherein the second set of frames is generated using the metadata.

4. The non-transitory computer readable medium as recited in claim 3, wherein the metadata is recorded in a stream concurrently with recording of the first video clip, and wherein the stream is stored separately from the first video clip.

5. The non-transitory computer readable medium as recited in claim 1, wherein a third entity visible in the first set of frames is out-of-focus, and wherein the operations further comprise:

generating a third set of frames with the third entity being in-focus and the first and second entities being out-of-focus; and storing the third set of frames as a third video clip.

6. The non-transitory computer readable medium as recited in claim 5, wherein storing the third set of frames as the third video clip comprises storing metadata in association with the third video clip, the metadata comprising information corresponding to: (a) the first, second, and third entities, and (b) which of the first, second, and third entities is in-focus.

7. The non-transitory computer readable medium as recited in claim 1, wherein the second entity is a particular person.

8. The non-transitory computer readable medium as recited in claim 1, wherein the second entity is a particular object.

9. The non-transitory computer readable medium as recited in claim 1, wherein generating a second set of frames with the second entity being in-focus and the first entity being out-of-focus comprises maintaining a focus on the second entity while a position of the second entity moves relative to the second set of frames.

10. The method of claim 1, wherein softening the first set of image portions corresponding to the first entity to render the first entity out-of-focus comprises softening the first set of image portions on a pixel-by-pixel basis.

11. The method of claim 1, wherein sharpening the second set of image portions corresponding to the second entity to render the second entity in-focus comprises sharpening the second set of image portions on a pixel-by-pixel basis.

12. A system comprising:

one or more processors; and a non-transitory computer readable medium comprising one or more sequences of instructions which, when executed by the one or more processors, cause the one or more processors to perform operations comprising:

receiving a first video clip comprising a first set of frames, wherein the first video clip is generated by concurrently recording a first entity and a second entity using an image capture device;

wherein the first entity is (a) displayed within each of the first set of frames and (b) is in-focus in each of the first set of frames, and wherein the second entity is (a) displayed within each of the first set of frames and (b) is out-of-focus in each of the first set of frames;

receiving user input requesting a second video clip where the second entity is in-focus;

responsive to receiving the user input, generating a second video clip comprising a second set of frames with:

the second entity being displayed in-focus within each of the second set of frames; and the first entity being displayed out-of-focus within each of the second set of frames; and wherein generating the second video clip comprises:

determining, for each of the first set of frames, a first set of image portions corresponding to the first entity; and softening the first set of image portions corresponding to the first entity to render the first entity out-of-focus;

determining, for each of the first set of frames, a second set of image portions corresponding to the second entity;

sharpening the second set of image portions corresponding to the second entity to render the second entity in-focus; and storing the second video clip.

13. The system as recited in claim 12, wherein storing the second set of frames as the second video clip comprises storing metadata in association with the second video clip, the metadata comprising information corresponding to: (a) the first and second entities, and (b) which of the first and second entities is in-focus.

14. The system as recited in claim 12, wherein the operations further comprise:

receiving metadata associated with the first video clip, the metadata comprising information corresponding to the second entity, wherein the second set of frames is generated using the metadata.

15. The system as recited in claim 14, wherein the metadata is recorded in a stream concurrently with recording of the first video clip, and wherein the stream is stored separately from the first video clip.

16. The system as recited in claim 12, wherein a third entity visible in the first set of frames is out-of-focus, and wherein the operations further comprise:

generating a third set of frames with the third entity being in-focus and the first and second entities being out-of-focus; and storing the third set of frames as a third video clip.

17. The system as recited in claim 16, wherein storing the third set of frames as the third video clip comprises storing metadata in association with the third video clip, the metadata comprising information corresponding to: (a) the first, second, and third entities, and (b) which of the first, second, and third entities is in-focus.

18. A method comprising:

receiving a first video clip comprising a first set of frames, wherein the first video clip is generated by concurrently recording a first entity and a second entity using an image capture device;

wherein the first entity is (a) displayed within each of the first set of frames and (b) is in-focus in each of the first set of frames, and wherein the second entity is (a) displayed within each of the first set of frames and (b) is out-of-focus in each of the first set of frames;

receiving user input requesting a second video clip where the second entity is in-focus;

responsive to receiving the user input, generating a second video clip comprising a second set of frames with:

the second entity being displayed in-focus within each of the second set of frames; and the first entity being displayed out-of-focus within each of the second set of frames; and wherein generating the second video clip comprises:

determining, for each of the first set of frames, a first set of image portions corresponding to the first entity; and softening the first set of image portions corresponding to the first entity to render the first entity out-of-focus;

determining, for each of the first set of frames, a second set of image portions corresponding to the second entity;

sharpening the second set of image portions corresponding to the second entity to render the second entity in-focus; and storing the second video clip.

19. The method as recited in claim 18, wherein storing the second set of frames as the second video clip comprises storing metadata in association with the second video clip, the metadata comprising information corresponding to: (a) the first and second entities, and (b) which of the first and second entities is in-focus.

* * * * *